(12) United States Patent
Ogita et al.

(10) Patent No.: US 8,665,176 B2
(45) Date of Patent: Mar. 4, 2014

(54) DISPLAY APPARATUS

(75) Inventors: Takeshi Ogita, Tokyo (JP); Susumu Takatsuka, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 329 days.

(21) Appl. No.: 13/110,034

(22) Filed: May 18, 2011

(65) Prior Publication Data

US 2012/0081272 A1     Apr. 5, 2012

Related U.S. Application Data

(60) Provisional application No. 61/388,919, filed on Oct. 1, 2010.

(51) Int. Cl.
 *G09G 5/00* (2006.01)
(52) U.S. Cl.
 USPC .............................................................. 345/4
(58) Field of Classification Search
 None
 See application file for complete search history.

(56) References Cited

U.S. PATENT DOCUMENTS

| | | | |
|---|---|---|---|
| 6,661,425 B1 * | 12/2003 | Hiroaki | 345/629 |
| 2004/0252076 A1 | 12/2004 | Kodama | |
| 2005/0073471 A1 | 4/2005 | Selbrede | |
| 2007/0091011 A1 | 4/2007 | Selbrede | |
| 2008/0088649 A1 * | 4/2008 | Ikeno et al. | 345/690 |
| 2008/0192013 A1 | 8/2008 | Barrus et al. | |
| 2011/0210964 A1 * | 9/2011 | Chiu et al. | 345/419 |

FOREIGN PATENT DOCUMENTS

JP     2007-334237     12/2007

* cited by examiner

*Primary Examiner* — Adam R Giesy
(74) *Attorney, Agent, or Firm* — Oblon, Spivak, McClelland, Maier & Neustadt, L.L.P.

(57) ABSTRACT

A display apparatus including a display section that includes a plurality of thin display devices formed at multiple layers such that their display screens overlap with one another, wherein at least one of the display devices closest to a viewing side of the display section is configured to be transparent, and control means for controlling each display of the plurality of display devices of the display section.

15 Claims, 20 Drawing Sheets

OBSERVATION DIRECTION ↓

DIRECT CURRENT

OBSERVATION DIRECTION ↓

PLUS ⊕ ← → MINUS ⊖

FIG. 5A
FIG. 5B
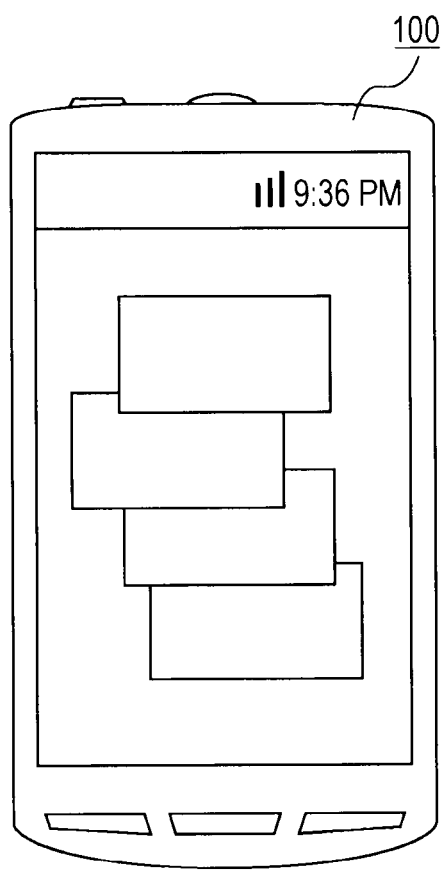
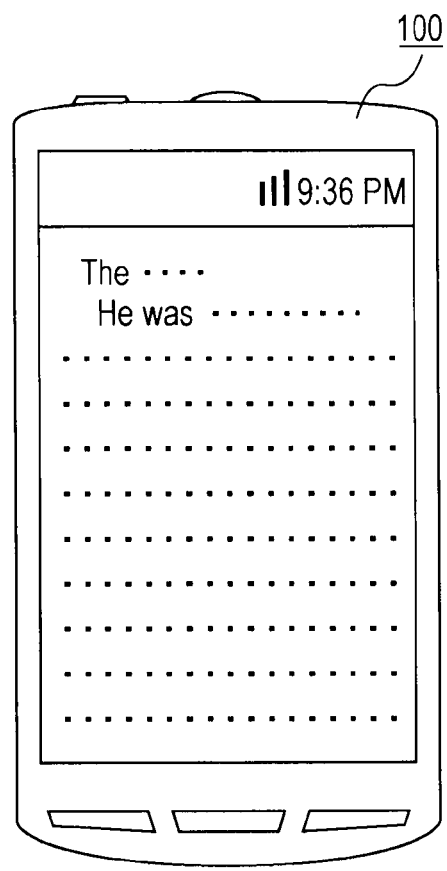

PHOTO

MOVING PICTURE

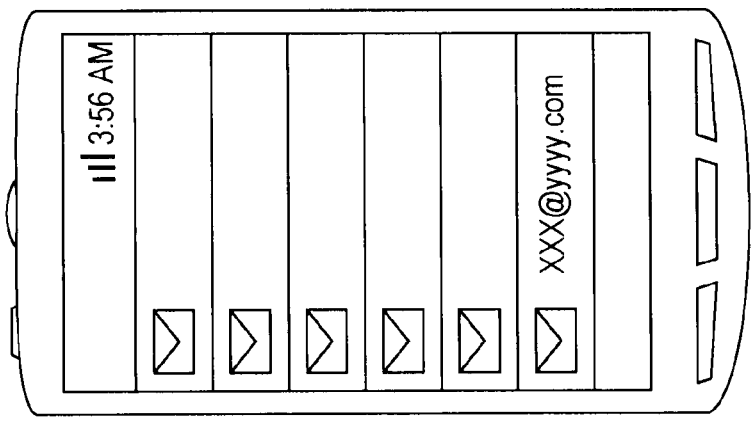
FIG. 7C  MAILER
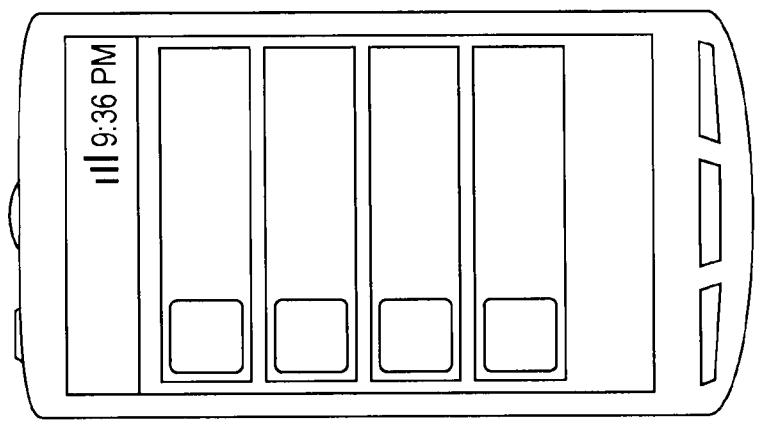
FIG. 7B  TWITTER
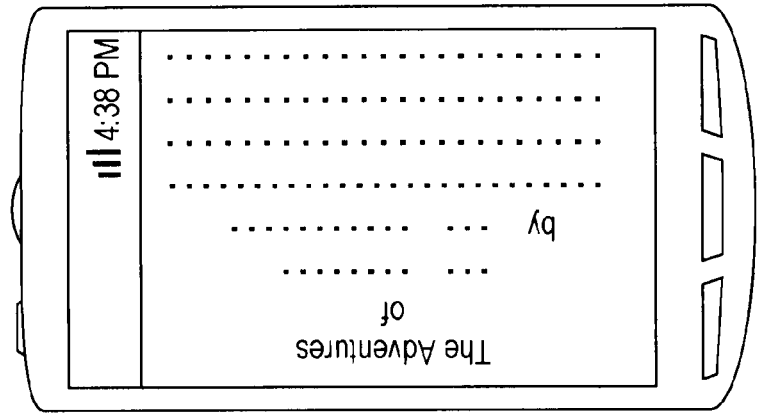
FIG. 7A  E-BOOK

DESKTOP

MAILER

MOVING PICTURE

DISPLAY APPARATUS

CROSS REFERENCE TO RELATED APPLICATIONS

This application is related to and claims priority under 35 U.S.C. §119(e) to Provisional Application Ser. No. 61/388,919, filed Oct. 1, 2010, the contents of which are hereby incorporated herein by reference.

BACKGROUND

1. Field

The present specification relates to a display apparatus configured using various thin display devices such as an organic EL (Organic Electro-Luminescence) display panel, an LCD (Liquid Crystal Display) panel, and an electronic paper.

2. Description of the Related Art

Thin display devices such as an organic EL display panel and an LCD panel are used in various display apparatuses. In recent years, extremely thin display devices such as a so-called electronic paper capable of electrically controlling display have been put to practical use. The electronic paper has high visibility and being thin and flexible with low power consumption, but has slow response speed during display change.

That is, the electronic paper has the following advantages: (1) the power consumption is not necessary for display, or an extremely small amount of power is sufficient therefor, and thus the power consumption at the time of rewriting is also extremely low; and (2) its viewing angle is wide and its visibility is excellent even under direct sunlight, and since a plastic film or the like which is formed to be thin like paper is used as a display base, it is possible to perform display without lowering display quality even when bending the electronic paper. However, in the case of an electrophoretic electronic paper, there are disadvantages in that the response speed during display change is slow and it is not suitable for moving picture display.

Besides the utilization form in which the electronic paper having such characteristics is used in, for example, an electronic book reader apparatus that displays so-called electronic book data transferred as digital data, various new utilization forms are conceivable. For example, Japanese Unexamined Patent Application Publication No. 2007-334237 to be described later discloses a display system in which moving picture contents such as movies are displayed on a normal monitor apparatus such as an LCD display apparatus in the same manner used in the past, and textual information, management information, and the like added to the moving picture contents are displayed on an electronic paper.

In Japanese Unexamined Patent Application Publication No. 2007-334237, the monitor apparatus, which displays moving picture contents, and the electronic paper apparatus, which displays textual information associated with the corresponding moving picture contents, are configured to be separated. With such a configuration, in order to display the textual information and the like, reproduction of the moving picture contents is stopped, or the moving picture and the textual information are displayed in a superimposed manner. In such a manner, it is possible to avoid inconvenience such as difficulty viewing the display information.

In recent years, various kinds of so-called mobile apparatuses such as mobile phone terminals, personal information terminals called PDAs (Personal Digital Assistants), and personal laptop computers have come into widespread use. Since the mobile apparatus is used while being carried, a battery is used as a drive power source. For this reason, it is preferable that power consumption in the mobile apparatus should be as low as possible. The reason is that discharge of battery should be avoided when possible.

For this reason, in the mobile apparatuses, in the same manner as Japanese Unexamined Patent Application Publication No. 2007-334237 mentioned above, it can be considered that there are provided a display device having a high response speed and relatively high power consumption and a display device having a low response speed and extremely low power consumption. In addition, by changing the display devices used in accordance with the display information, it is possible to achieve lower power consumption than the mobile apparatuses of the related art equipped with only a display device having a high response speed and relatively high power consumption.

As it is, in the mobile apparatuses, as information to be displayed is diversified, not only the size of display screen increases, but also there is a demand for a decrease in size and weight, and thus it is difficult to provide a plurality of display devices each of which has a large display screen. The reason is that providing the plurality of display devices each of which has a large display screen is linked with the increase in size of the mobile apparatus.

In consideration of the above, without increasing the size of the casing itself and decreasing the size of the display screen, it is desirable to provide a display apparatus including a plurality of display devices each of which has a relatively large screen.

BRIEF SUMMARY

According to an embodiment, there is provided a display apparatus including a display section that has a plurality of thin display devices formed at multiple layers such that their display screens overlap with one another, wherein at least one of the display devices closest to a viewing side of the display section is configured to be transparent; and control means for controlling each display of the plurality of display devices of the display section.

According to another embodiment, a method is provided that is implemented on a display apparatus that includes a plurality of thin display devices formed at multiple layers such that their display screens overlap with one another, wherein at least one of the display devices closest to a viewing side of the display section is configured to be transparent, the method including storing setting information associating at least one application program with one of the display devices; and controlling the display devices according to the setting information.

According to another embodiment, a mobile terminal apparatus is provided including a display section that includes a plurality of thin display devices formed at multiple layers such that their display screens overlap with one another, wherein at least one of the display devices closest to a viewing side of the display section is configured to be transparent; and a controller that controls each display of the plurality of display devices of the display section.

In the display apparatus according to an embodiment described herein, the plurality of thin display devices is laminated so that their display screens overlap with one another, thereby forming the display section. In this case, among the plurality of laminated display devices, the display device, which is formed so that another display device is present on the lower layer side thereof, is configured to be transparent. Thus, when the information is displayed on the lower-layerside display device, it is possible to view the display of the lower-layer-side display device through another display device of the upper layer. In addition, the control means controls each display of the plurality of laminated display devices.

With such a configuration, without increasing the size of the casing itself and decreasing the size of the display screen of the display device, by providing a display apparatus with a plurality of display devices each of which has a relatively large display screen, it is possible to selectively use the display devices.

According to the embodiment, without increasing the size of the casing itself and decreasing the size of the display screen, it is possible to embody a display apparatus including a plurality of display devices each of which has a relatively large display screen. In addition, it is possible to selectively use the plurality of display devices in accordance with the display information and the like.

BRIEF DESCRIPTION OF THE DRAWINGS

FIGS. 5A and 5B are diagrams illustrating selective use of the first display device and the second display device of the multi-layer-type display section in the mobile phone terminal;

FIGS. 7A, 7B, and 7C is a diagram illustrating selective use of the first display device and the second display device of the multi-layer-type display section in the mobile phone terminal;

DETAILED DESCRIPTION

Hereinafter, an embodiment will be described with reference to the drawings. The embodiment described hereinafter will be described by exemplifying cases where the embodiment is applied to mobile phone terminals called a smart phone and the like.

It should be noted that the smart phone functions as combination of the mobile phone terminal and the portable information terminal. That is, the smart phone has not only a phone function of normal verbal communication and the like but also various kinds of functions such as a basic function of connecting to a network such as the Internet and a function of managing schedules, personal information, and the like as a main function of the portable information terminal.

[Exemplary Configuration of Mobile Phone Terminal]

Figure 1:
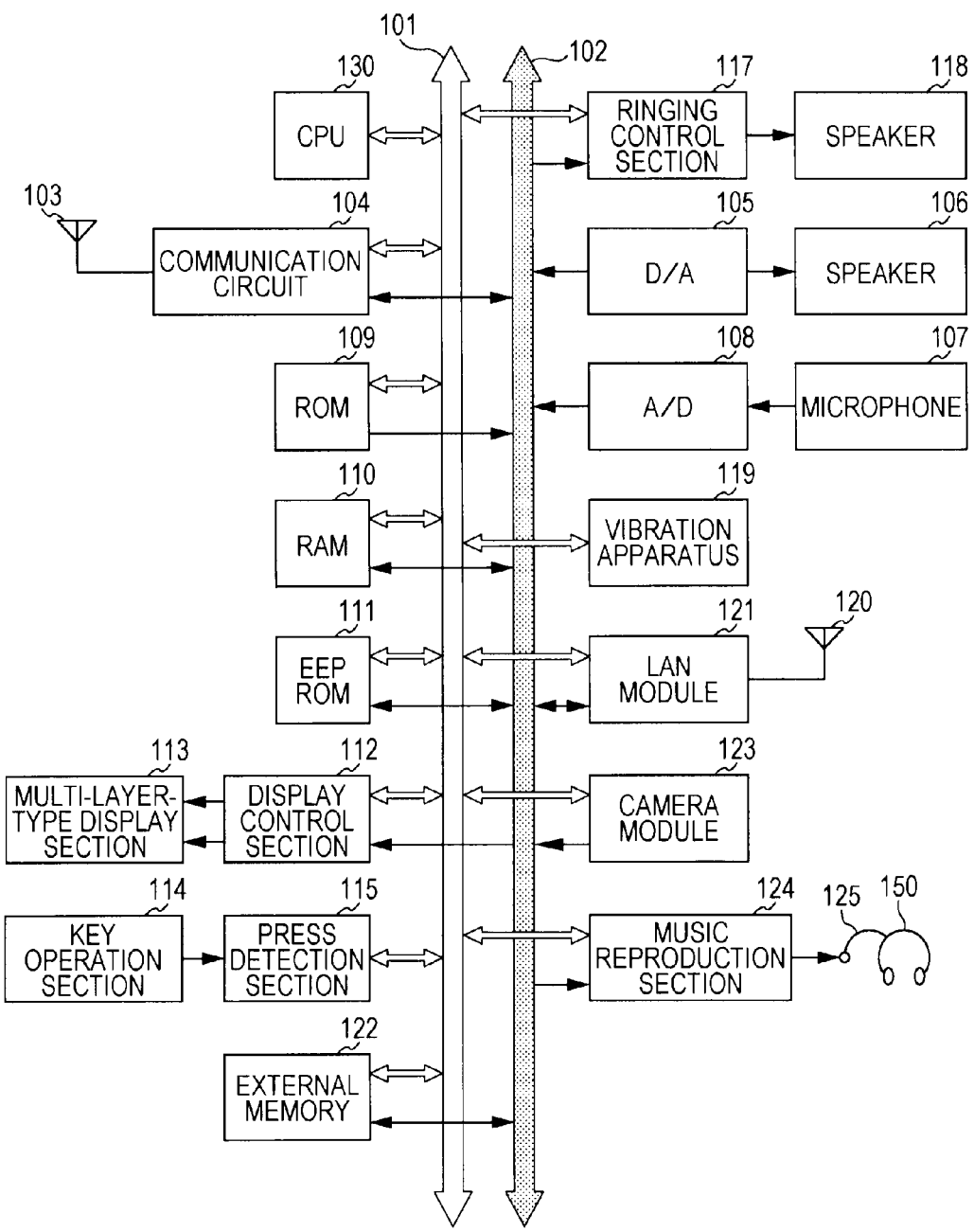
FIG. 1 is a block diagram illustrating an exemplary configuration of a mobile phone terminal according to an embodiment.

First, an exemplary configuration of a mobile phone terminal 100 according to the embodiment will be described. FIG. 1 is a block diagram illustrating an exemplary configuration of a mobile phone terminal 100 according to the embodiment.

A shown in FIG. 1, the mobile phone terminal 100 according to the embodiment is provided with a control line (control bus) 101 and a data line (data bus) 102. The control line 101 is used for the transmission of a control signal, and the data line 102 is used for the transmission of various data.

The control line 101 is connected, as shown in FIG. 1, to a CPU (Central Processing Unit) 130, a communication circuit 104, a ROM (Read Only Memory) 109, and a RAM (Random Access Memory) 110.

Further, the control line 101 is connected to an EEPROM (Electrically Erasable and Programmable ROM) 111, a display control section 112, a press detection section 115, a ringing control section 117, a vibration device 119, and a LAN (Local Area Network) module 121. Furthermore, the control line 101 is connected to an external memory 122, a camera module 123, and a music reproduction section 124.

The data line 102 is connected to, as shown in FIG. 1, the communication circuit 104, the ROM 109, RAM 110, the EEPROM 111, the display control section 112, a D/A converter 105, an A/D converter 108, and the ringing control section 117. Further, the data line 102 is connected to the LAN module 121, the external memory 122, the camera module 123, and the music reproduction section 124.

As shown in FIG. 1, the communication circuit 104 is connected to a transceiving antenna 103. Further, the display control section 112 is connected to a multi-layer-type display section 113. The detailed configuration of the multi-layer-type display section 113 will be described later.

Further, the press detection section 115 is connected to a key operation section 114. Three basic operation keys (home, menu, and return) are provided on the lower side of the front surface of the mobile phone terminal 100 according to the embodiment.

Further, although not shown in the drawing, a power supply button switch and the like are provided on the surface of the mobile phone terminal 100. Moreover, at predetermined positions on the left side surface and the right side surface of the mobile phone terminal 100, there are provided a volume key for adjusting the volume level, a shutter key operated when the camera functions to be described later are used, a so-called jog dial key capable of rotation operation and press operation, and the like.

As described above, the key operation section 114 including various operation keys and button switches provided as hardware keys is formed on the casing of the mobile phone terminal 100 according to the embodiment.

Further, as shown in FIG. 1, in the case of the mobile phone terminal 100 according to the embodiment, the LAN module 121 is connected to a LAN transceiving antenna 120. Further, the D/A converter 105 is connected to a speaker 106 used as an earpiece. The speaker 106 is provided on the upper side of the front surface of the mobile phone terminal 100.

Further, the A/D converter 108 is connected to a microphone (in FIG. 1, represented as "MIC") 107 used as a mouthpiece. The MIC 107 is provided on, for example, the bottom side of the mobile phone terminal 100. The ringing control section 117 is connected to a speaker 118. A music reproduction section 124 can be connected to an earphone 150 through an output terminal 125 of a sound signal.

Further, although not shown in the drawing, the mobile phone terminal 100 uses a rechargeable battery pack as a power source. A power supply circuit, which supplies drive power to each circuit unit when the power source of the mobile phone terminal 100 is turned on, is also provided.

In the mobile phone terminal 100, the CPU 130, the ROM 109, the RAM 110, and the EEPROM 111 constitutes a microcomputer. The microcomputer functions as the main control section which controls each section of the mobile phone terminal 100.

It should be noted that the external memory 122 is a so-called memory card using, for example, a semiconductor memory having a relatively large storage capacity of several tens of megabytes to several gigabytes, and is configured to be removable from the mobile phone terminal 100.

The external memory 122 is configured, for example, as described later, to store various data such as music data and image data downloaded through the Internet and a LAN or dynamic image data and still image data obtained by photography through the camera module 123 to be described later.

Further, the external memory 122 may be used in such a way of appropriately replacing a plurality of data in accordance with the storage capacity, the types of stored data, and the like. Further, by providing the mobile phone terminal 100 with a plurality of slots on which the external memories 122 are mounted, a plurality of external memories 122 may be mounted in the mobile phone terminal 100 at the same time so as to be selectively used.

Although not shown in FIG. 1, by attaching a touch panel to the whole surface of the display screen of the multi-layer-type display section 113, the touch panel and the display information, which is displayed on the display screen of the multi-layer-type display section 113, may constitute an information input unit. However, for convenience of description of the embodiment to be described hereinbelow, a description will be given of an example of a case where an operation input from a user is received mainly through the key operation section 114.

[Exemplary Configuration of Multi-Layer-Type Display Section 113]

In the mobile phone terminal 100 according to the embodiment, the multi-layer-type display section 113 is formed by laminating two different display devices. The display screens of the display devices have relatively large sizes of, for example, 4 inches or more, and the display screens overlap with each other. In the embodiment, as in the external appearance thereof shown in FIGS. 5A and 5B to be described later, most (for example, six tenths or more) of the front surface of the mobile phone terminal 100 is covered by the display screen of the display device.

Figure 2:
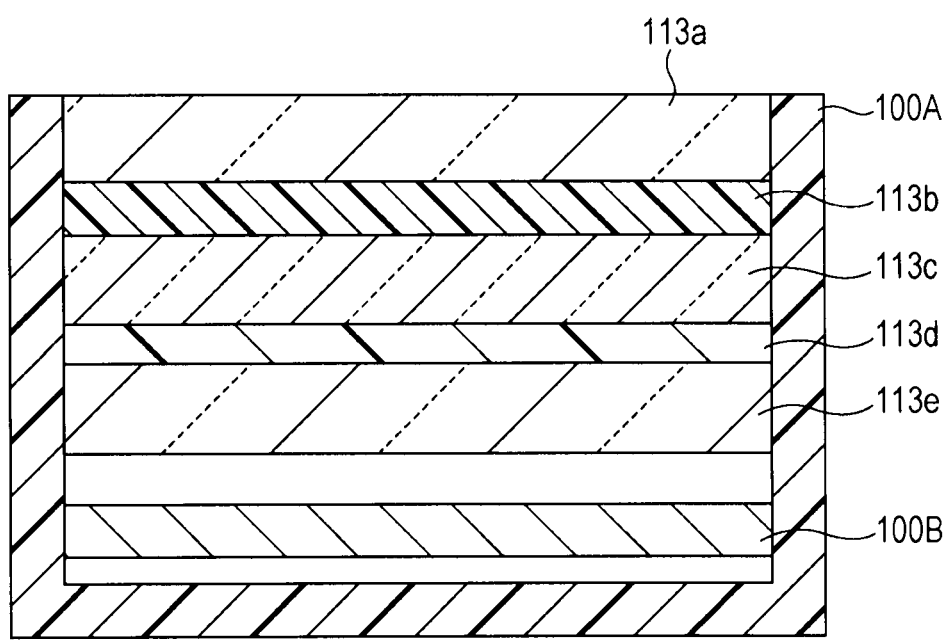
FIG. 2 is a cross-sectional view illustrating a structure of a multi-layer-type display section used in the mobile phone terminal.

A detailed description will be given of the configuration of the multi-layer-type display section 113. FIG. 2 is a cross-sectional view illustrating a structure of the multi-layer-type display section 113 used in the mobile phone terminal 100 according to the embodiment. FIG. 2 is also a cross-sectional view of a portion of the multi-layer-type display section 113 of the mobile phone terminal 100 cut along the horizontal direction intersecting with the lengthwise direction (the vertical direction).

As shown in FIG. 2, in the casing 100A of the mobile phone terminal 100, the multi-layer-type display section 113 is formed by laminating, in order from the upper layer side which is the side viewed by a user, a transparent plate 113a, an adhesive sheet 113b, a first display device 113c, an adhesive sheet 113d, a second display device 113e, and a base 100B.

In FIG. 2, the casing 100A is the casing of the mobile phone terminal 100 itself and is made of plastic. The transparent plate 113a is made of a transparent material such as plastic or glass, and thus has function of protecting the display screen of the multi-layer-type display section 113.

The adhesive sheet 113b is configured to be able to attach the first display device 113c to the transparent plate 113a which is the upper layer thereof. Likewise, the adhesive sheet 113d is configured to be able to attach the second display device 113e to the first display device which is the upper layer thereof.

The adhesive sheets 113b and 113d are made of a transparent tape or a resin cured by ultraviolet rays. Therefore, it is preferable that the refractive index of the adhesive sheets 113b and 113d should be close to the respective refractive indices of the transparent plate 113a, the first display device 113c, and the second display device 113e. If the adhesive sheets 113b and 113d are not provided, air gaps may occur between the transparent plate 113a and the first display device 113c, and between the first display device 113c and the second display device 113e.

Generally, since the refractive indices of the transparent plate 113a and the first display device 113c are higher than that of the air gap, a critical angle occurs. Therefore, when light is incident from a high refractive index material (the transparent plate 113a or the first display device 113c) to the interface of a low refractive index material (the air gap), total internal reflection occurs at an incident angle larger than the critical angle. For this reason, for example, since external light is strong out of doors and is reflected by the transparent plate 113a and first display device 113c, it is difficult to visually recognize the display of the first display device 113c or the second display device 113e.

Accordingly, the adhesive sheets 113b and 113d having refractive indices close to the refractive indices of the first and second display devices 113c and 113e are provided just ahead of the first and second display devices 113c and 113e. Thereby, by preventing the strong external light from being reflected, even in a place in which the external light is strong, it is possible to secure visibility of display information.

In the embodiment, the first display device 113c of the multi-layer-type display section 113 is configured to be transparent since the second display device 113e is present on the lower layer side thereof. The first display device 113c employs a display device having transparency such as a transparent organic EL display panel (hereinafter, referred to as a transparent organic EL display) or a transparent LCD panel.

In the description of the embodiment, the first display device 113c of the multi-layer-type display section 113 employs a single-surface-emitting transparent organic EL display which has a relatively high power consumption but has a high response speed during display change and is capable of high quality image display with full colors.

Figure 3:
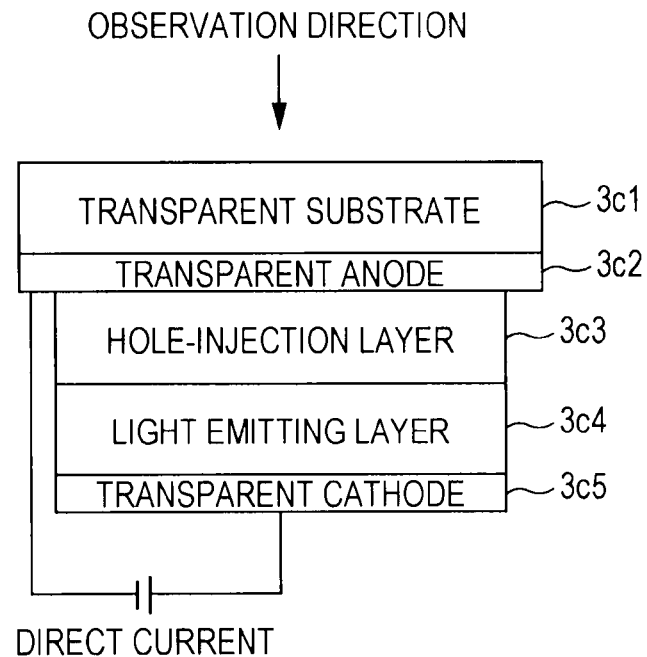
FIG. 3 is a diagram illustrating an exemplary configuration of a transparent organic EL display used as a first display device of the multi-layer-type display section.

FIG. 3 is a diagram illustrating an exemplary configuration of a transparent organic EL display used as a first display device 113c of the multi-layer-type display section 113 according to the embodiment. The exemplary transparent organic EL display 113c is formed by laminating a transparent substrate 3c1, transparent anode 3c2, a hole-injection layer 3c3, a light emitting layer 3c4, and a transparent cathode 3c5.

The transparent substrate 3c1 is made of a transparent material such as glass or transparent plastic. The transparent anode 3c2 is made of a transparent material, such as an ITO (Indium Tin Oxide), having conductivity. Further, the hole-injection layer 3c3 is formed by using polythiophene/polystyrenesulfonate (PEDOT-PSS), copper phthalocyanine (CuPc), and the like.

Further, the light emitting layer 3c4 is formed by using, for example, an organic solvent solution of aromatic polymer and the like. Further, the transparent cathode 3c5 is formed by using, for example, a metal thin film such as a calcium thin film, a magnesium thin film, or an aluminum thin film with a low work function. It is apparent that the above-mentioned materials are examples, and that various other materials may be used, and a newly developed material may be used.

In the case of the transparent organic EL display 113c shown in FIG. 3, the transparent cathode 3c5 is configured to function as an electron transport layer. Accordingly, by applying a voltage between the transparent anode 3c2 and the transparent cathode 3c5, holes are injected from the transparent anode 3c2, and electrons are injected from the transparent cathode 3c5.

In this case, the holes from the transparent anode 3c2 are injected through the hole-injection layer 3c3 to the light emitting layer 3c4, and the electrons from the transparent cathode 3c5 are injected from the transparent cathode 3c5, which functions as the electron transport layer, to the light emitting layer 3c4. The injected holes and electrons are combined in the light emitting layer 3c4. The energy resulting from the combination excites the light emitting material of the light emitting layer 3c4. When the excitation state returns to the ground state, light is generated.

As described above, the transparent organic EL display 113c emits light by itself by excitation of holes and electrons in the light emitting layer 3c4. It should be noted that, in the configuration shown in FIG. 3, the transparent organic EL display has a single color. As it is, the hole-injection layer 3c3 and the light emitting layer 3c4 are configured so that a plurality of the hole-injection layers 3c3 and light emitting layers 3c4 having mutually different colors is separated from each other by banks.

In such a manner, the transparent organic EL display 113c which has relatively high power consumption but has a high response speed and is capable of displaying a color image with a high accuracy. In addition, the exemplary configuration of the transparent organic EL display 113c shown in FIG. 3 is an exemplary configuration in all respects, and the transparent organic EL display having the structure may be used. As other examples of the transparent organic EL display, there are various examples such as the display disclosed in Japanese Unexamined Patent Application Publication No. 2002-296375.

On the other hand, since another display device does not exist on the lower layer side of the second display device 113e of the multi-layer-type display section 113 according to the embodiment, it is not necessary for the display device to be transparent. For this reason, in the embodiment, the second display device 113e of the multi-layer-type display section 113 employs a device which has a low response speed and is thus inappropriate for displaying a moving picture or an image such as a photo with a high quality, but which is appropriate for displaying textual information with extremely low power consumption.

As the second display device 113e, for example, the so-called electronic paper, a polymer-dispersed liquid crystal panel, a cholesteric liquid crystal panel, or an LED display panel may be used. In the description of the embodiment, the second display device 113e employs the electronic paper.

In addition, the polymer-dispersed liquid crystal panel, which can be used as the second display device 113e, employs a liquid crystal system using a phase separation structure of liquid crystal in the polymer matrix. The polymer-dispersed liquid crystal does not use a polarizer and an alignment layer, and thus is able to achieve a brighter screen with low power consumption.

Further, the cholesteric liquid crystal panel employs cholesteric liquid crystal which is one type of liquid crystal material, and thus has a characteristic of "bistability" that is able to maintain two states of light transmission and light reflection without application of electric power. Furthermore, in the case of reflection, the cholesteric liquid crystal panel has a characteristic that selectively reflects only light with a certain specific wavelength. The cholesteric liquid crystal panel is also able to achieve a brighter screen with low power consumption.

Further, the LED display apparatus (LED panel) is a display panel apparatus using a semiconductor element which emits light when the forward voltage is applied. The light emitting principle of the LED (Light Emitting Diode) uses an electroluminescence effect. By using combination of a plurality of LEDs, the LED display panel is configured to be able to display textual information. The LED display panel is also able to achieve lower power consumption than the first display device 113c.

Figure 4:
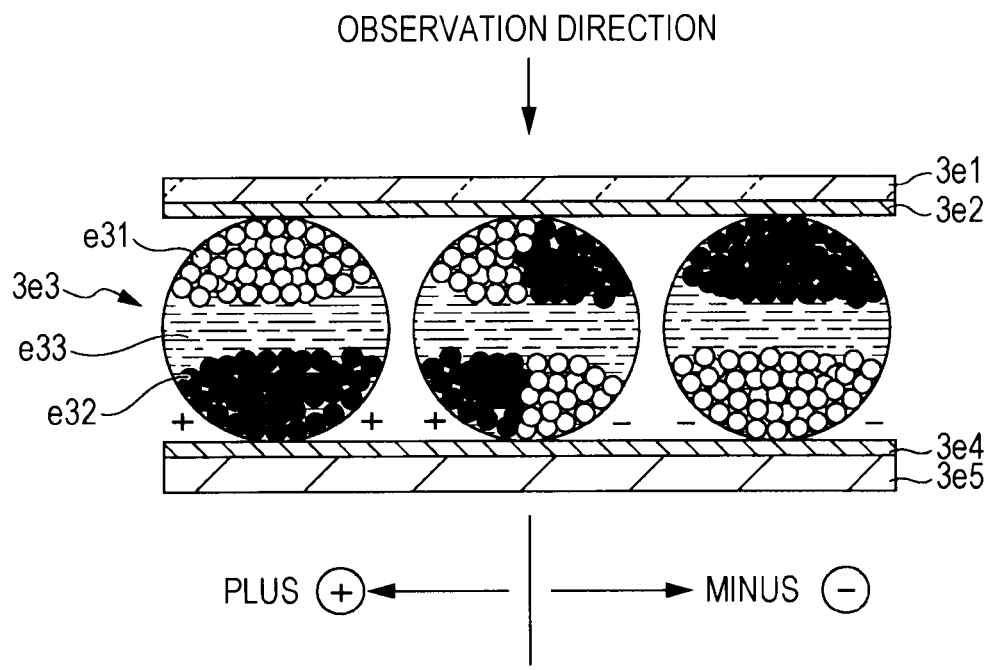
FIG. 4 is a diagram illustrating an example of an electronic paper used as a second display device of the multi-layer-type display section.

Next, an example of the electronic paper used as the second display device 113e of the multi-layer-type display section 113 according to the embodiment will be described. FIG. 4 is a diagram illustrating the electronic paper used as the second display device 113e of the multi-layer-type display section 113 according to the embodiment.

The electronic paper, which is used as the second display device 113e according to the embodiment, employs an electrophoretic method which is a typical display technique of the electronic paper 113e. As shown in FIG. 4, the electronic paper 113e used in the embodiment is formed of a transparent electrode 3e2, which is provided on the lower side of the transparent surface layer 3e1, and a lower electrode 3e4, which is provided on the upper side of a supporting layer 3e5, with micro capsules 3e3 interposed therebetween.

The transparent electrode 3e2 is made of ITO or the like. Further, the lower electrode 3e4 is formed by using a plurality of micro rectangular electrodes having a size corresponding to the display resolution. In addition, each micro capsule 3e3 has a diameter of about 40 μm (micrometer) and is transparent. The micro capsules 3e3 are tightly arranged between the transparent electrode 3e2 and the lower electrode 3e4.

The micro capsule 3e3 contains a plurality of positively charged white pigment particles (for example, titanium-oxide particles) e31 and a plurality of negatively charged black pigment particles (for example, carbon black particles) e32 together with a transparent fluid (an oil).

In the electronic paper 113e, by applying a voltage from an external control circuit, electric field is generated between the transparent electrode 3e2 and the lower electrode 3e4, and thereby the positively and negatively charged white and black particles e31 and e32 migrate in the oil e33. In addition, by collecting the pigment particles of the color, which is selected by the applied voltage, on the display surface side of the capsules, black-and-white display is performed. Then, the black-and-white display is selected for each pixel formed of micro electrodes. Even when the voltage is cut off, the pigment particles do not move easily, and thus the display can be read like print.

It should be noted that the electronic paper 113e is a so-called monochrome display. In addition, as described above, the response speed of the electronic paper 113e is low but the power consumption thereof is extremely low, viewing angle thereof is wide, and visibility thereof is excellent even under direct sunlight. Thus, the electronic paper is suitable for display of textual information.

As described above, the multi-layer-type display section 113 according to the embodiment is formed in a way that the first display device (the transparent organic EL display) 113c and the second display device (the electronic paper) 113e are laminated so that the display screens thereof overlap with each other. In addition, as described later in detail, in accordance with application software (processing programs) each of which has different display information, the display using the first display device 113c and the display using the second display device 113e are switched.

[Basic Operations of Mobile Phone Terminal 100 Operation for Telephone Function]

Next, basic operations of the mobile phone terminal 100 having the configuration shown in FIG. 1 will be described. First, an operation (a process) for responding to an incoming call will be described.

An incoming call notification signal, which has arrived, is received and tuned by the transceiving antenna 103 and the communication circuit 104. The signal tuned by the communication circuit 104 is demodulated by the communication circuit 104, and the CPU 130 is notified of the demodulated signal through the control line 101.

If the received and tuned signal is an incoming call notification signal for which destination is the mobile phone terminal 100 itself, the CPU 130 reads ringtone data for generating a ring tone prepared in advance in the ROM 109 and the like, and supplies the read ringtone data to the ringing control section 117.

The ringing control section 117 generates a ringtone signal of an analog signal from the ringtone data supplied thereto, and supplies the ringtone signal to the speaker 118. Thus, a ringtone corresponding to the ringtone signal is output from the speaker 118 so that the user of the mobile phone terminal 100 is notified of the incoming call.

Similarly, upon detecting the incoming call notification signal of which destination is the mobile phone terminal 100 itself, the CPU 130 controls the vibration device 119 to vibrate so that the user of the mobile phone terminal 100 can be notified of an incoming call. In addition, both of the incoming call notification based on ringtone and the incoming call notification based on vibration can be used at the same time, or only one of them can be used.

When the user of the mobile phone terminal 100 perceives arrival of an incoming call to the user's mobile phone terminal 100 through ringtone or vibration, the user performs a predetermined operation for starting a telephone call on the mobile phone terminal 100. The predetermined operation for starting the telephone call is, for example, to press a call start key (an off-hook key) provided in the key operation section 114.

When the predetermined operation for starting the telephone call is performed, the CPU 130 is notified of the operation through the control line 101. In addition, when the predetermined operation for starting the telephone call is performed through the key operation section 114, this operation is detected by the press detection section 115, and the CPU 130 is notified of the operation through the control line 101.

Upon receiving the notification of the predetermined operation for starting the telephone call, the CPU 130 controls the communication circuit 104 to perform a process for connecting to a predetermined communication line, such as a process of sending a response signal. Thus, a communication line is established between the communication terminal originating the call and the mobile phone terminal 100 so that the telephone call can be made therebetween.

Specifically, a signal sent from the other party originating the call is received and tuned through the transceiving antenna 103 and the communication circuit 104. The received and tuned signal sent from the other party is subjected to processing such as demodulation into a baseband signal by using the communication circuit 104. The baseband signal is supplied to the D/A converter 105 through the data line 102.

The D/A converter 105 converts the supplied baseband signal into an analog signal, and supplies the analog signal to the speaker 106. Thus, a voice corresponding to the signal sent from the other party is output from the speaker 106.

Further, the voice of the user of the mobile phone terminal 100 is picked up by the microphone 107, and is supplied to the A/D converter 108 as an analog electrical signal. The A/D converter 108 converts the supplied analog sound signal into a digital signal (a baseband signal), and supplies the digital signal to the communication circuit 104 through the data line 102.

The communication circuit 104 generates a transmission signal including the digital signal supplied thereto by modulation and the like, and sends the transmission signal through the transceiving antenna 103. Thus, the user voice is sent to the other party of the communication. In such a manner, in response to the incoming call to the mobile phone terminal 100, a communication line is established between the mobile phone terminal 100 and the other party originating the call so that a telephone call can be made therebetween.

Next, the process for making a call by using the mobile phone terminal 100 will be described. When a user makes a call by using the mobile phone terminal 100, the user inputs the telephone number of the other party as destination through the key operation section 114.

Then, the input number information is recognized by the CPU 130. The CPU 130 temporarily stores the recognized number information in, for example, the RAM 110. Then, a predetermined operation for making a call, for example, an operation of pressing the call start key (the off-hook key) provided in the key operation section 114 is performed. In this case, the CPU 130 generates a call originating signal including the received telephone number, and sends the call originating signal through the communication circuit 104 and the transceiving antenna 103.

The call originating signal is sent to the telephone terminal of the other party as destination through telephone company facilities such as a base station and a switchboard. When the other party performs a response operation in response to the call originating signal, a response signal is sent from the other party.

Upon receiving the response signal, under control of the CPU 130, the communication circuit 104 confirms that a communication line has been established with the other party as destination. Then, similarly to the case where a telephone call is made in response to an incoming call to the mobile phone terminal 100 described above, a telephone call is made through the transceiving antenna 103, the communication circuit 104, the D/A converter 105, the speaker 106, the microphone 107, and the A/D converter 108.

In the case of making a call, a call originating process may be performed in the following way: the telephone number of the other party as destination is selected from so-called telephone directory data, which may be registered in advance in for example the EEPROM 111 of the mobile phone terminal 100; and the predetermined operation for making a call is performed.

In this way, the mobile phone terminal 100 is able to respond to an incoming call or is able to make a call to the other party as the destination.

[Operation for Connection to Internet]

Next, a function of accessing the Internet will be described. The mobile phone terminal 100 according to the embodiment is able to search for information and download any necessary information by accessing the Internet and accessing a target homepage through, for example, the function, which is provided by the telephone company. Further, the mobile phone terminal 100 is also able to send and receive electronic mail through the Internet.

When connecting to the Internet through the mobile phone terminal 100, the user performs a predetermined operation for connection to the Internet through, for example, the key operation section 114. When detecting the predetermined operation for connection to the Internet, the CPU 130 controls the communication circuit 104 through the control line 101 so that a request for connecting to the Internet is generated in the communication circuit 104 and is sent through the transceiving antenna 103. Upon receiving the request for connecting to the Internet, the telephone company's system connects the requesting mobile phone terminal 100 to the Internet in response to the request.

Thereby, the mobile phone terminal 100 is connected to the Internet and accesses a target server so as to send and receive packet data. In such a manner, by issuing a request for providing the necessary information, the mobile phone terminal 100 is able to receive the information provided in response to the request. With such a configuration, it is possible to browse a target webpage, and it is also possible to download and use various data such as music data, moving picture data, still image data, and e-book data.

The mobile phone terminal 100 is also able to create electronic mail for transmission inside a transmission folder in the EEPROM 111. In this case, by inputting characters through the key operation section 114, it is possible to create electronic mail for transmission while checking the input characters displayed on the display device of the multi-layer-type display section 113 through the display control section 112.

In order to send the electronic mail for transmission which has been generated inside the transmission folder in the EEPROM 111 in the manner described above, the operation for sending the electronic mail is performed through the key operation section 114. In this case, the CPU 130 controls the communication circuit 104 to send electronic mail created inside the transmission folder in the EEPROM 111 to the mail server of the designated party.

When electronic mail that has arrived is accumulated on the mail server of the mobile phone terminal 100, the operation for instructing reception of the electronic mail that has arrived is performed through the key operation section 114. In this case, the CPU 130 controls the communication circuit 104 to access the mail server of the mobile phone terminal 100 to download electronic mail that has arrived, and stores the electronic mail in a reception folder in the EEPROM 111.

The electronic mail that has arrived and has been stored in the reception folder in the EEPROM 111 in the manner described above is read under control of the CPU 130, and is supplied to the display control section 112 through the data line 102.

Accordingly, the electronic mail that has arrived is supplied to the multi-layer-type display section 113 through the display control section 112 and is displayed on the display screen of the multi-layer-type display section 113. In this way, the electronic mail sent to the mobile phone terminal 100 from another party is obtained and displayed on the multi-layer-type display section 113, thereby enabling the user to read the electronic mail.

As described above, the mobile phone terminal 100 is capable of, in addition to merely performing telephone communication, due to the function for connecting to the Internet, performing other processes through the Internet, such as obtaining information or sending and receiving electronic mail. That is, the mobile phone terminal 100 is capable of performing, as broadband communication functions, Internet-based data communication as well as telephone communication.

[Operation for Using Other Functions]

Further, upon receiving a predetermined operation input, which is for performing communication through the LAN module 121, through the key operation section 114, the CPU 130 controls the LAN module 121. Then, by connecting to a predetermined LAN through the neighboring wireless router, it is possible to send and receive data between itself and the devices connected to the corresponding LAN.

Further, the camera module 123 is formed of an imaging lens, an image pickup device such as a CCD (Charge Coupled Device) image sensor and a CMOS (Complementary Metal Oxide Semiconductor) image sensor, a camera signal processing circuit, and the like.

When an operation for starting to shoot, such as an operation of pressing a shutter key provided in the key operation section 114, is performed, the operation is detected by the press detection section 115, and the CPU 130 is notified of the operation through the control line 101. In this case, the CPU 130 controls the camera module 123 to do the shooting, and is able to store image data, which can be obtained by the shooting, in the external memory 122 through the data line 102. It should be noted that the lens section of the camera module 123 is provided on the side opposite to the front panel side on which the display screen of the multi-layer-type display section 113 of the mobile phone terminal 100 is provided.

Further, in response to the user's operation input which is received through the key operation section 114 and the press detection section 115, under control of CPU 130, the image data stored in the external memory 121 becomes accessible.

In this case, the image data stored in the external memory 121 can be accessed in a way that the data is read under control of the CPU 130, is supplied to the multi-layer-type display section 113 through the display control section 112, and is displayed on the display screen of the display device of the multi-layer-type display section 113.

Further, upon receiving a predetermined operation input for reproducing music contents through the key operation section 114 and the press detection section 115, the CPU 130 is notified of the information corresponding to the operation input through the control line 101.

In this case, the CPU 130 reads the music data as a reproduction target from the external memory 122, and supplies the data to the music reproduction section 124 through the data line 102. The music reproduction section 122 generates an analog sound signal for reproduction from the music data supplied thereto, and outputs the signal through the sound output terminal 125. The sound output terminal 125 is configured, as shown in FIG. 1, to be connectable with the earphone 150 and the like. Thus, the user is able to hear the reproduced sound through the earphone 150.

Here, a description was given of reproduction of the music data, but the music reproduction section 122 has a function of reproducing sound data in a broad sense, and is thus able to reproduce various sound data including so-called dialog sound data and others.

As described above, the mobile phone terminal 100 is able to perform telephonic communication by connecting to the telephone network, and is able to browse a webpage and download necessary data by connecting to the Internet. Further, the mobile phone terminal 100 is also able to upload data to a target server. Furthermore, the mobile phone terminal 100 is also able to send and receive various data by connecting to the LAN through the LAN module 121.

Further, the mobile phone terminal 100 has a camera function, and is thus able to use the function in storing the dynamic image data and the still image data, which is obtained by shooting dynamic images and still images, in the external memory 122, and reproducing the dynamic image data and the still image data stored in the external memory 122. Moreover, the music reproducing function can be used in reproducing the music data stored in the external memory 122.

Other than these, in the mobile phone terminal 100 according to the embodiment, various application software (processing programs) are provided in, for example, the EEPROM 111. Thus, by executing those, it is also possible to execute various functions such as address list management, schedule management, and map searching through the executed program.

[Selective Use of First and Second Display Devices of Multi-Layer-Type Display Section 113]

The mobile phone terminal 100 according to the embodiment has, as described above, the multi-layer-type display section 113. The CPU 130 of the mobile phone terminal 100 controls, with the aid of the display control section 112, in response to the application software executed in the mobile phone terminal 100, selection as to which one of the first and second display devices of the multi-layer-type display section 113 is used.

FIGS. 5A, 5B, 6A, 6B, 7A, 7B, and 7C are diagrams illustrating the selective use of the first display device (the transparent organic EL display) 113c and the second display device (the electronic paper) 113e of the multi-layer-type display section 113 in the mobile phone terminal 100 according to the embodiment.

The mobile phone terminal 100 according to the embodiment has, as shown in FIG. 5A, a normal mode of promptly displaying a photo, a moving picture, or the like with high quality on the first display device (the transparent organic EL display) 113c of the multi-layer-type display section 113. Further, the mobile phone terminal 100 has, as shown in FIG. 5B, a text mode of mostly displaying textual information (text data) on the second display device (the electronic paper) 113e of the multi-layer-type display section 113.

The CPU 130 of the mobile phone terminal 100 is able to select the normal mode and the text mode in accordance with the application software executed in the mobile phone terminal 100 in cooperation with the display control section 112. It should be noted that hereinbelow the various application software may be simply referred to as OO software.

Figure 6A:
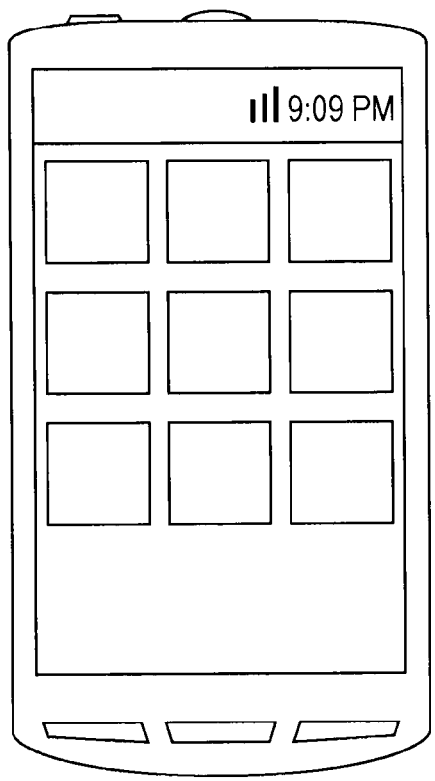
FIGS. 6A and 6B are diagrams illustrating selective use of the first display device and the second display device of the multi-layer-type display section in the mobile phone terminal.
Figure 6B:
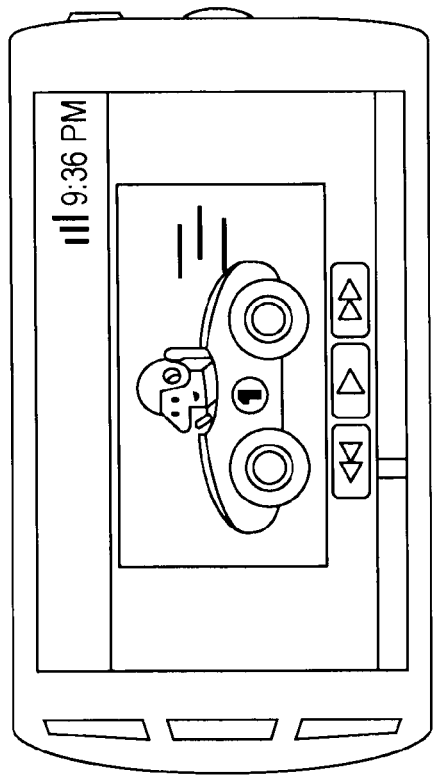

For example, as shown in FIG. 6A, when photo-display software (Photo) for displaying a photo (a still image) is executed, the CPU 130 performs the information display, with the aid of the display control section 112, on the first display device 113c of the multi-layer-type display section 113. Further, as shown in FIG. 6B, when moving picture display software (Moving Picture) for displaying a moving picture is executed, the CPU 130 also performs the information display, with the aid of the display control section 112, on the first display device 113c of the multi-layer-type display section 113.

As described above, in the case of executing application software for displaying with high quality the still image and the moving picture which are necessary to display information with high quality at a high response speed, the CPU 130 and the display control section 112, in cooperation with each other, perform the information display on the first display device of the multi-layer-type display section 113.

On the other hand, as shown in FIG. 7A, when electronic book reading software (E-Book) is executed, the CPU 130 and the display control section 112, in cooperation with each other, control the information display on the second display device 113e of the multi-layer-type display section 113. Likewise, as shown in FIG. 7B, when so-called twitter software (Twitter) is executed, the CPU 130 and the display control section 112, in cooperation with each other, also control the information display on the second display device 113e of the multi-layer type display section 113. Further, as shown in FIG. 7C, when mailer software (Mailer) is executed, the CPU 130 and the display control section 112, in cooperation with each other, also control the information display on the second display device 113e of the multi-layer-type display section 113.

As described above, in a case of executing application software which has no problems even at a low response speed and which is necessary to clearly display mainly textual information (text data), the CPU 130 and the display control section 112, in cooperation with each other, perform the information display on the second display device 113e of the multi-layer-type display section 113.

As shown in FIGS. 6A, 6B, 7A, 7B, and 7C, for each application software which can be executed in the mobile phone terminal 100, the display device used may be set in advance. In this case, it is possible to register the setting in the memory of the mobile phone terminal 100 in advance. In such a manner, whenever the mobile phone terminal 100 executes the application software, by checking the information registered in the memory, it is possible to automatically determine on which one of the first and second display devices 113c and 113e the information is displayed.

Figure 8:
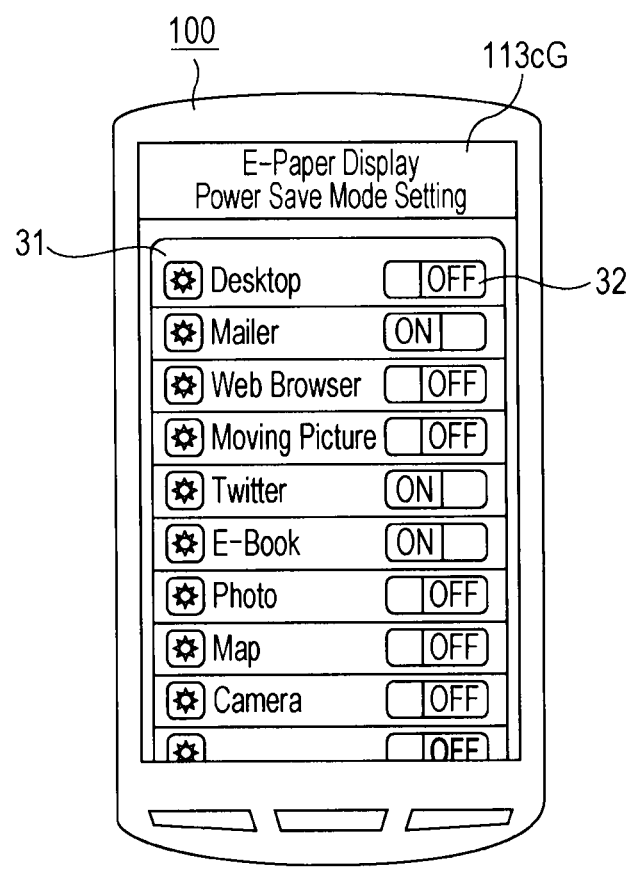
FIG. 8 is a diagram illustrating an example of a setting screen for setting the display device used for each application software executable in the mobile phone terminal.

FIG. 8 is a diagram illustrating an example of a setting screen for setting the display device used for each application software executable in the mobile phone terminal 100. The setting screen shown in FIG. 8 is displayed on the first display device 113c of the multi-layer-type display 113 by selecting the column of "E-paper display power save mode setting" from a predetermined menu.

The setting screen shown in FIG. 8 is provided with an application title column 31 which shows the titles of executable application software and an ON/OFF setting column 32 of the second display device 113e.

In the setting screen shown in FIG. 8, for each executable application software, the ON/OFF setting as to whether or not information is displayed on the electronic paper of the second display device 113e is performed on the ON/OFF setting column 32 of the second display device 113e. If the setting is turned ON in order to perform display on the electronic paper as the second display device 113e, in order not to use the transparent organic EL display as the first display device 113c, the first display device is turned OFF.

In contrast, if the setting is turned OFF in order not to use the electronic paper as the second display device 113e, in order to display information on the transparent organic EL display as the first display device 113c, the first display device is turned ON.

In the case of the example of the setting screen shown in FIG. 8, in order not to display the basic operation screen (Desktop), which is displayed at the time the mobile phone terminal 100 is activated, on the second display device (the electronic paper) 113e, the second display device 113e is set to the OFF state. That is, the setting is made so that the basic operation screen (Desktop) is displayed on the first display device (the transparent organic EL display) 113c.

Likewise, in the case of the application software such as webpage browsing software (hereinafter, referred to as a browser (Web Browser)), moving picture display software (Moving Picture), photo display software (Photo), map display software (Map), and photography software (Camera), the setting is made so that the first display device 113c is used in the display. That is, in the case of the application software which is necessary to display a moving picture or a still image such as a photo or a map with a high quality, the second display device 113e is turned off, and the first display device 113c is used in information display.

In contrast, in the case of the application software such as electronic mail software (Mailer), twitter software (Twitter), and electronic book reading software (E-Book), the setting is made so that the second display device 113e is used in information display. That is, in the case of the application software for mostly displaying textual information (text data), the second display device 113e is turned on so that the display is performed on the second display device 113e, and the first display device 113c is not used.

Such a setting is enabled by allowing the press detection section 115 to detect the user's operation input, which is performed on the key operation section 114, for the setting screen shown in FIG. 8 displayed on the first display device 113c of the multi-layer-type display section 113. In the case of the embodiment, the CPU 130 sets the first display device 113c or the second display device 113e as the display device used for each application software in a predetermined area of the EEPROM 111.

In addition, even when the setting is made so that the first display device 113c is used, for example, even when the browser (Web Browser) or the like is used, the display information may be a large volume of textual information. In this case, it is preferable to use the second display device (the electronic paper) 113e in that the information is made to be visible and the power consumption is low.

In contrast, even when the setting is made so that the second display device 113e is used, for example, even when the electronic book reading software (E-Book) is used, there may be electronic book data including a large number of images such as photos. In this case, it is preferable to use the first display device (the transparent organic EL display) 113c in that the photos and the like can be clearly displayed to be visible.

In the mobile phone terminal 100 according to the embodiment, during the execution of the application software, the display device used in the display of the multi-layer-type display section 113 can be changed by the user. As described with reference to FIG. 8, even when the display device used in display for each executable application software is set, by the operation input which is performed through the key operation section 114, the display device used in display can be changed.

Figure 9:
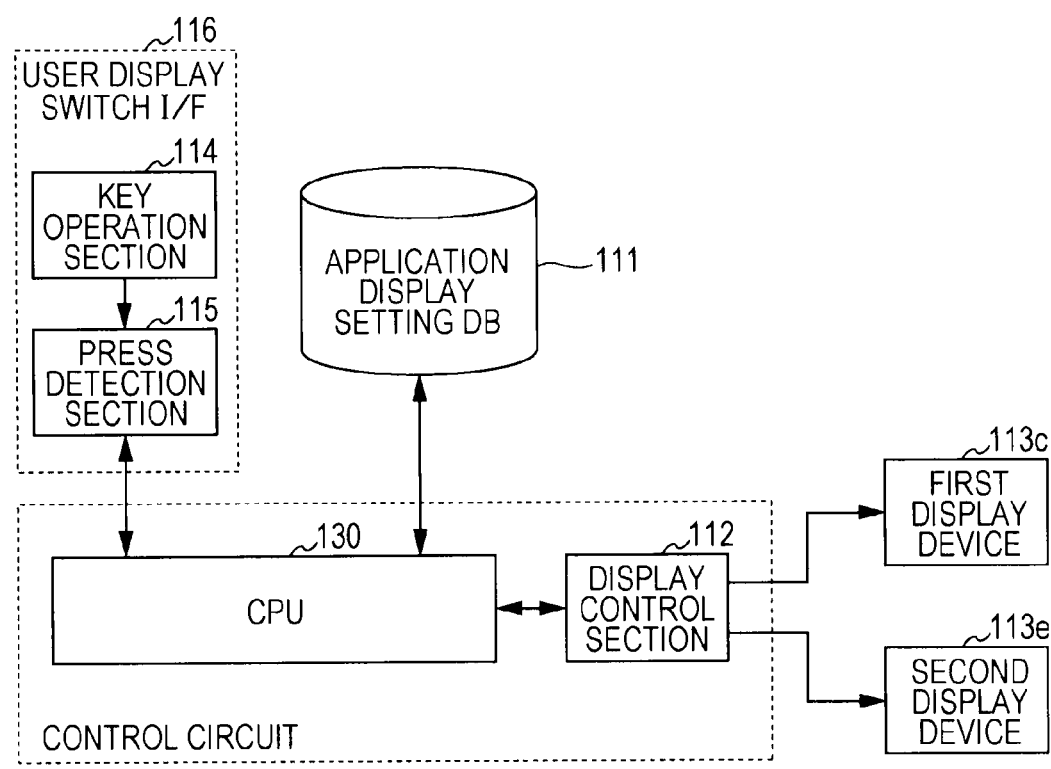
FIG. 9 is a block diagram illustrating constituent portions which function when display is performed on the multi-layer-type display section in the mobile phone terminal.

FIG. 9 is a block diagram illustrating constituent portions which function when display is performed on the multi-layer-type display section 113 in the mobile phone terminal 100, which has the configuration shown in FIG. 1, according to the embodiment. In the mobile phone terminal 100 according to the embodiment, as described above, the multi-layer-type display section 113 is provided. Thus, it is possible to selectively use the first and second display devices 113c and 113e of the multi-layer-type display section 113.

In addition, in the mobile phone terminal 100 according to the embodiment, for convenience of description, it is assumed that basic operation screen (Desktop) and the various setting screens are displayed on the first display device (the transparent organic EL display) 113c which has a high response speed. It is apparent that, if there is no problem in the response speed and the like, the basic operation screen (Desktop) and various setting screens can be also displayed on the second display device (the electronic paper) 113e.

As described above, the "E-paper display power save mode setting" is selected from the menu, the CPU 130 and the display control section 112, in cooperation with each other, perform the display of the setting screen, which is shown in FIG. 8, on the first display device 113c of the multi-layer-type display section 113.

In addition, as described above, the user performs the setting input through the key operation section 114 and the press detection section 115, thereby setting the display device which displays information for each application software. The setting input can be received by the CPU 130, and as shown in FIG. 9, is registered in the application display setting data base (hereinafter referred to as AD setting DB) of the EEPROM 111. That is, the AD setting DB of the EEPROM 111 stores and retains the setting information associated with the display device used for each application software.

Then, when the user inputs the instruction input to execute the target application software through the key operation section 114 and the press detection section 115, in response to the input, the CPU 130 reads the target program from the ROM 109, and executes the program. In this case, in accordance with the executed application software, the CPU 130 specifies the display device of the multi-layer-type display section 113 which displays information through the executed application software, on the basis of the setting information (the AD setting) of the AD setting DB of the EEPROM 111.

Then, the CPU 130 performs, with the aid of the display control section 112, the information display on the display device which is specified on the basis of the setting information of the AD setting DB between the first display device 113c and the second display device 113e provided in the multi-layer-type display section 113.

Specifically, the application software such as the browser (Web Browser) or the moving picture display software (Moving Picture) for mostly displaying still images or the moving pictures may be executed. In this case, on the basis of the setting information of the AD setting DB, the CPU 130 displays, with the aid of the display control section 112, information on the first display device (the transparent organic EL display) 113c of the multi-layer-type display section 113.

Further, the application software such as the electronic mail software (Mailer) for mostly displaying the textual information may be executed. In this case, on the basis of the setting information of the AD setting DB, the CPU 130 displays, with the aid of the display control section 112, information on the second display device (the electronic paper) 113e of the multi-layer-type display section 113.

Further, as shown in FIG. 9, the key operation section 114 and the press detection section 115 implements a function as a user display switch interface (in FIG. 9, represented as a user display switch I/F). Accordingly, upon receiving the change instruction of the display device through the key operation section 114 and the press detection section 115, the CPU 130 is able to change the display device.

That is, when the target application software is executed and information is displayed on the first display device 113c of the multi-layer-type display section 113, the instruction to change the display device is input by the user through the key operation section 114 and press detection section 115. In this case, the CPU 130 controls the display control section 112, in response to the instruction input for changing the display device by the user, to change the display device for displaying information from the first display device 113c to the second display device 113e.

Likewise, when the target application software is executed and information is displayed on the second display device 113e of the multi-layer-type display section 113, the instruction to change the display device is input by the user through the key operation section 114 and press detection section 115. In this case, the CPU 130 controls the display control section 112, in response to the instruction input for changing the display device by the user, to change the display device for displaying information from the second display device 113e to the first display device 113c.

As described above, in the mobile phone terminal 100 according to the embodiment, the CPU 130 receives the setting input of the display device through the key operation section 114 and the press detection section 115, and is able to generate the AD setting DB in the EEPROM 111.

As described above, when the application software is executed in response to the instruction issued by the user, on the basis of the setting information of the AD setting DB of the EEPROM 111, the CPU 130 is able to automatically specify which display device of the multi-layer-type display section 113 is used. Then, the CPU 130 is able to perform, with the aid of the display control section 112, the information display on the specified display device.

Moreover, during the execution of the application software, the CPU 130 is able to receive the instruction for changing the display device through the key operation section 114 and the press detection section 115. In this case, the CPU 130 controls the display control section 112, in response to the change instruction, to change the display device for displaying information in the multi-layer-type display section 113.

[Display Process at the Time of Executing the Application Software of Mobile Phone Terminal 100]

Figure 10:
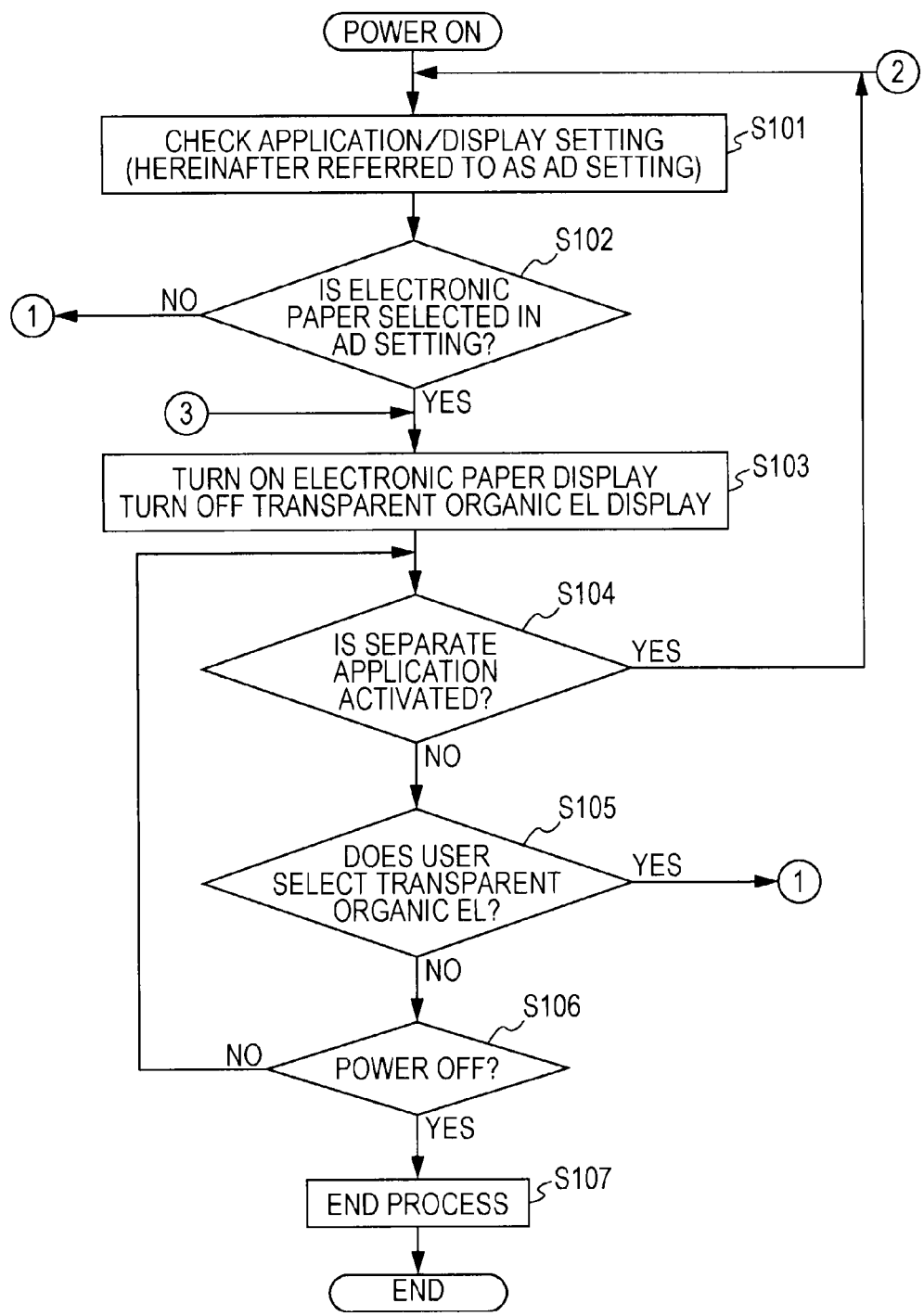
FIG. 10 is a flowchart illustrating a display process of information at the time of executing application software in the mobile phone terminal.
Figure 11:
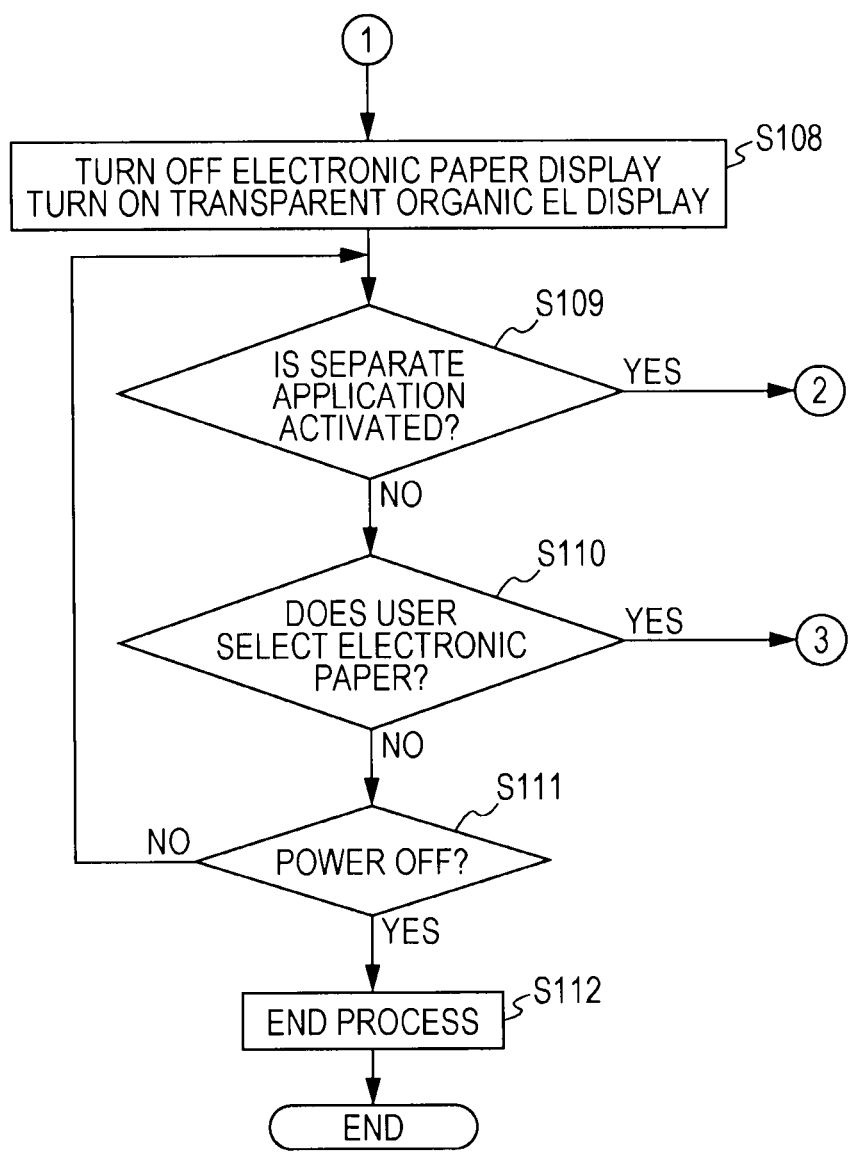
FIG. 11 is a flowchart continuing from FIG. 10.

Next, a description will be given of the display process of the information at the time of executing the application software in the mobile phone terminal 100 according to the embodiment. FIGS. 10 and 11 are flowcharts illustrating a display process of information at the time of executing the application software in the mobile phone terminal 100.

The process shown in FIGS. 10 and 11 is a process which is executed mainly in the CPU 130 when a power source is applied to the mobile phone terminal 100 according to the embodiment. When the power source is applied to the mobile phone terminal 100, the CPU 130 checks (refers to) the application display setting (hereinafter, referred to as the AD setting) of the AD setting DB of the EEPROM 111 (step S101). In addition, in step S101 right after the application of the power source, the CPU 130 refers to the setting of the basic operation screen (Desktop). Further, as described later, after the setting is made so that the application software is executed, the CPU 130 refers to the AD setting for the application software to be executed in step S101.

Then, the CPU 130 determines whether or not the AD setting used as the reference in step S101 is made so that the second display device (the electronic paper) 113e of the multi-layer-type display section 113 is used (step S102). In the determination process of step S102, it is determined that the AD setting is made so that the second display device (the electronic paper) 113e of the multi-layer-type display section 113 is used. In this case, the CPU 130 controls the display control section 112 to turn on the second display device (the electronic paper) 113e and turn off the first display device (the transparent organic EL display) 113c (step S103).

In the process of step S103, the display of the information is performed on the second display device 113e of the multi-layer-type display section 113. Accordingly, the information display, which is performed on the second display device 113e positioned below the first display device 113c, can be viewed through the first display device 113c of the multi-layer-type display section 113.

Then, the CPU 130 allows a user to terminate the current application software through the key operation section 114 and the press detection section 115, and determines whether or not a different application software is set to be activated (step S104).

In the determination process of step S104, if it is determined that a different application software is set to be executed, the CPU 130 repeats the process from step S101. That is, as described above, in step S101, on the basis of the application software set to be newly executed, the CPU 130 refers to the AD setting of the AD setting DB of the EEPROM 111. Then, the application software set to be newly executed specifies the display device of the multi-layer-type display section 113 used in the information display. Then, the process from step S102 is executed.

In the determination process of step S104, if it is determined that a different application software is not set to be executed, the CPU 130 determines whether or not the user inputs the instruction to change the display device of the multi-layer-type display section 113 through the key operation section 114 (step S105). The process of step S105 is a process of determining whether or not the user issues the instruction of the change from the second display device (the electronic paper) 113e to the first display device (the transparent organic EL display) 113c.

In the determination process of step S105, if it is determined that the instruction to change the display device is not input, the CPU 130 determines whether or not the user performs an operation of turning off the power source through the key operation section 114 (step S106). In the determination process of step S106, if it is determined that the power source is not turned off, the CPU 130 repeats the process from step S104. Thereby, the CPU 130 waits for events such as the change of the application software, the change of the display device, and the power off.

Further, in the determination process of step S106, if it is determined that the power source is turned off, the CPU 130 performs a predetermined end process such as closing a reference file (step S107), and ends the process of FIGS. 10 and 11.

In contrast, in the determination process of step S102, if the AD setting is not made so that the second display device (the electronic paper) 113*e* is used, and in the determination process of step S105, if it is determined that the instruction input for changing the display device is performed, the flow advances to the process of step S108 in FIG. 11.

In this case, the CPU 130 controls the display control section 112 to turn off the second display device (the electronic paper) 113*e* and turn on the first display device (the transparent organic EL display) 113*c* (step S108).

Through the process of step S108, information is displayed on the first display device 113*c* of the multi-layer-type display section 113. Accordingly, it is possible to view the information display which is performed on the first display device 113*c* positioned above the second display device 113*e* of the multi-layer-type display section 113.

Then, the CPU 130 allows a user to terminate the current application software through the key operation section 114 and the press detection section 115, and determines whether or not a different application software is set to be activated (step S109).

In the determination process of step S109, if it is determined that a different application software is set to be executed, the CPU 130 repeats the process from step S101 shown in FIG. 10. That is, as described above, in step S101, on the basis of the application software set to be newly executed, the CPU 130 refers to the AD setting of the AD setting DB of the EEPROM 111. Then, the application software set to be newly executed specifies the display device of the multi-layer-type display section 113 used in the information display. Then, the process from step S102 is executed.

In the determination process of step S109, if it is determined that the different application software is not set to be executed, the CPU 130 determines whether or not the user inputs the instruction to change the display device of the multi-layer-type display section 113 through the key operation section 114 (step S110). The process of step S110 is a process of determining whether or not the user issues the instruction of the change from first display device (the transparent organic EL display) 113*c* to the second display device (the electronic paper) 113*e*.

In the determination process of step S110, if it is determined that the instruction to change the display device is input, the CPU 130 performs the process from step S103 shown in FIG. 10. Thereby, the display device used in the information display is changed from the first display device (the transparent organic EL display) 113*c* to the second display device (the electronic paper) 113*e*.

In the determination process of step S110, if it is determined that the instruction to change the display device is not input, the CPU 130 determines whether or not the user performs an operation of turning off the power source through the key operation section 114 (step S111). In the determination process of step S111, if it is determined that the power source is not turned off, the CPU 130 repeats the process from step S109. Thereby, the CPU 130 waits for events such as the change of the application software, the change of the display device, and the power off.

Further, in the determination process of step S111, if it is determined that the power source is turned off, similarly to the above-mentioned process of step S107, the CPU 130 performs the predetermined end process such as closing the reference file (step S112), and ends the process of FIGS. 10 and 11.

Advantages of Embodiment

As described above, the mobile phone terminal 100 according to the embodiment includes the multi-layer-type display section 113 in which the first display device 113*c* and the second display device 113*e* are laminated so that their display screens overlap with each other. Then, in accordance with the executed application software, the CPU 130 of the mobile phone terminal 100 selectively uses the first display device 113*c* and the second display device 113*e* of the multi-layer-type display section 113.

In the mobile phone terminal 100 according to the above-mentioned embodiment, the transparent organic EL display is used as the first display device 113*c*, and the electronic paper is used as the second display device 113*e*.

For example, the power consumed by the organic EL display or the liquid crystal display, of which the size of the display screen is about 3 inches, is about 300 mW (milliwatt) or more. As described above, the power consumed by the organic EL display used in the display device of the mobile apparatus accounts for most of the power consumed by the mobile terminal. Thus, this have a great effect on the serviceable time (the time for which electric power can be supplied from the battery) of the mobile apparatus.

For this reason, it is necessary for the display device to achieve a decrease in power consumption. At the present day, one of the low-power-consumption display devices is the electronic paper. When the size of the display screen of the electronic paper is about 3 inches, the power consumed by the electronic paper is 1 μW (micro Watt) or less. However, the display color of the electronic paper is monochrome, and the response speed thereof is low at the time of changing the display. Thus, the electronic paper has a low specification for the display device of the normal mobile apparatus or the like capable of viewing photos, moving pictures, and web content. However, since the electronic paper is excellent for so-called electronic books, the electronic paper is most suitable for the display of textual information (text data) like electronic book data.

In the future, it can be expected that electronic book data will be downloaded and displayed by the mobile phone terminal or the like. In such a case, it is not necessary to use the organic EL display or the liquid crystal display used in the past, in displaying the electronic book data. Accordingly, as in the mobile phone terminal 100 according to the above-mentioned embodiment, the multi-layer-type display section 113, which includes the first display device (the transparent organic EL display) 113*c* and the second display device (the electronic paper) 113*e*, is used.

As described with reference to FIGS. 5A and 5B, in the normal mode (the mode for performing full-color display), the display is performed by using the first display device (the transparent organic EL display) 113*c*. On the other hand, in the text mode (the mode for performing monochrome display and mainly textual information display), the first display device does not perform display, and the second display device (the electronic paper) 113*e* performs display.

In such a manner, in a scene which is not necessary to be displayed in the normal mode, by performing display using the electronic paper, it is possible to achieve a decrease in power consumption of the mobile phone terminal 100. Accordingly, it is possible to increase the serviceable time of the mobile phone terminal 100. In this case, as the time for displaying information by using the second display device (the electronic paper) 113*e* is longer, the effect on the decrease in power consumption is greater. Besides, in the case of the mobile phone terminal 100 according to the above-mentioned embodiment, even when two different display devices are provided, since the display devices are laminated so that their display screens overlap with each other, there is no such problem as an increase in size of the mobile phone terminal 100.

Modified Example 1

Modified Example 1 described hereinbelow also has a configuration basically the same as the configuration of the mobile phone terminal 100 according to the embodiment described with reference to FIGS. 1 to 4. Therefore, the mobile phone terminal of Modified Example 1 described hereinbelow is also represented as the mobile phone terminal 100, and will be described with reference to FIGS. 1 and 2 as necessary. However, the mobile phone terminal 100 according to the embodiment described hereinbelow is configured so that a touch panel is provided on the whole surface of the display screen of the multi-layer-type display section 113.

That is, as described above, the touch panel is added on the whole surface of the display screen of the multi-layer-type display section 113. Thus, the touch panel and the display information, which is displayed on the first display device 113*c* or the second display device 113*e* of the multi-layer-type display section 113, constitute an operation input receiving unit which receives the operation input.

Specifically, when the touch panel is touched by a finger or the like, coordinate information representing the touch position is supplied to the CPU 130. The CPU 130 recognizes display information, which is displayed on the display screen of the first display device 113*c* corresponding to the coordinate position, or display information, which is displayed on the display screen of the second display device 113*e* corresponding to the coordinate position, as the information which is input by a user.

The mobile phone terminal 100 of Modified Example 1 is different from that of the above-mentioned embodiment in the method of using the first display device 113*c* and the second display device 113*e* of the multi-layer-type display section 113.

That is, in the mobile phone terminal 100 according to the above-mentioned embodiment, only one of the first display device 113*c* and the second display device 113*e* included in the multi-layer-type display section 113 is used. Whereas, in the mobile phone terminal 100 of Modified Example 1 to be described hereinbelow, by making the display areas different, both of the first display device 113*c* and the second display device 113*e* are used at the same time.

Figure 12:
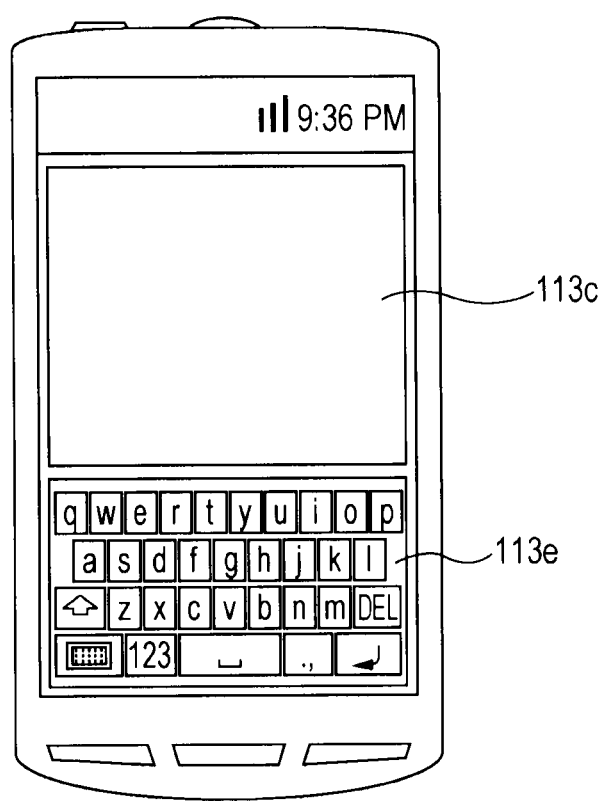
FIG. 12 is a diagram illustrating a method of using the multi-layer-type display section according to a Modified Example 1.
Figure 13A:
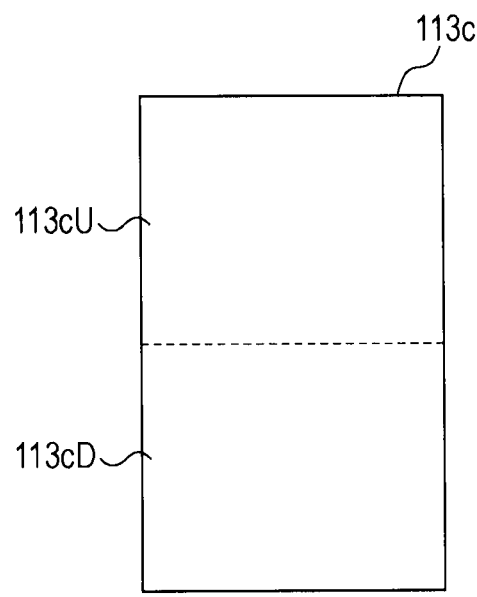
FIGS. 13A and 13B are diagrams illustrating the method of using the multi-layer-type display section according to the Modified Example 1.
Figure 13B:
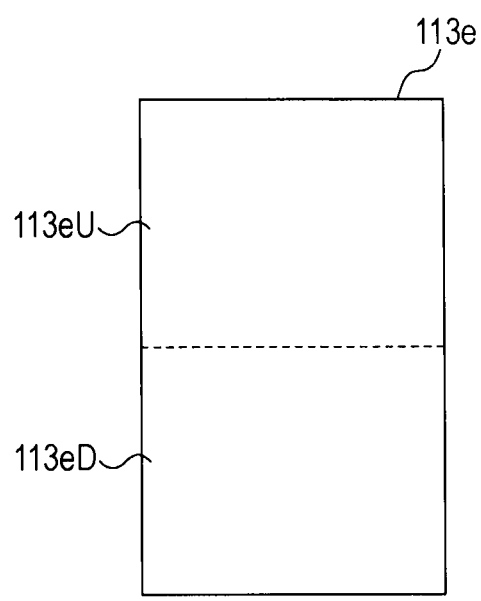

FIGS. 12, 13A, and 13B are diagrams illustrating the method of using the multi-layer-type display section 113 of Modified Example 1. As shown in FIG. 12, the upper half part of the display screen of the multi-layer-type display section 113 is set as a screen for browsing/writing a blog displayed on the first display device (the transparent organic EL display) 113*c*. In addition, as shown in FIG. 12, the lower half part of the display screen of the multi-layer-type display section 113 is set as a software keyboard screen displayed on the second display device (the electronic paper) 113*e*.

That is, as shown in FIG. 13A, the display screen of the first display device (the transparent organic EL display) 113*c* is partitioned into an upper half area 113*c*U and a lower half area 113*c*D, and the respective areas are configured to be independently turned ON/OFF. Likewise, as shown in FIG. 13B, the display screen of the second display device (the electronic paper) 113*e* is partitioned into an upper half area 113*e*U and a lower half area 113*e*D, and the respective areas are configured to be independently turned ON/OFF.

Then, when software for browsing/writing a blog is executed, the CPU 130 displays, as shown in FIG. 12, the screen for browsing/writing a blog on the upper half area 113*c*U of the first display device 113*c* of the multi-layer-type display section 113. In this case, the lower half area 113*c*D of the first display device 113*c* is turned off, and thus it is possible to view the display of the lower half area 113*e*D of the second display device 113*e* through the lower half area 113*c*D of the first display device 113*c*.

Further, the CPU 130 displays, as shown in FIG. 12, the software keyboard screen on the lower half area 113*e*D of the second display device (the electronic paper) 113*e* of the multi-layer-type display section 113. In this case, the upper half area 113*e*U of the second display device 113*e* is turned off to display nothing.

With such a configuration, the information of the blog can be viewed through the display performed on the upper half area 113*c*U of the first display device (the transparent organic EL display) 113*c*. Simultaneously, through the software keyboard and the touch panel which are displayed on the lower half area 113*e*D of the second display device (the electronic paper) 113*e*, information input can be performed.

In this case, for the first display device 113*c* which has a relatively high power consumption, only the upper half area 113*c*U thereof is turned on, and thus it is possible to achieve a decrease in power consumption. Moreover, by displaying the software keyboard on the lower half area 113*e*D of the second display device 113*e* which has extremely low power consumption, in combination with the touch panel, it is possible to constitute an indication information input unit (an operation input receiving unit) appropriate to input information.

Then, as described with reference to FIGS. 12, 13A, and 13B, when each of the first and second display devices 113*c* and 113*e* is partitioned into two areas, in accordance with the application software, it is possible to set which display device is used and which display area is used in the set display device.

Figure 14:
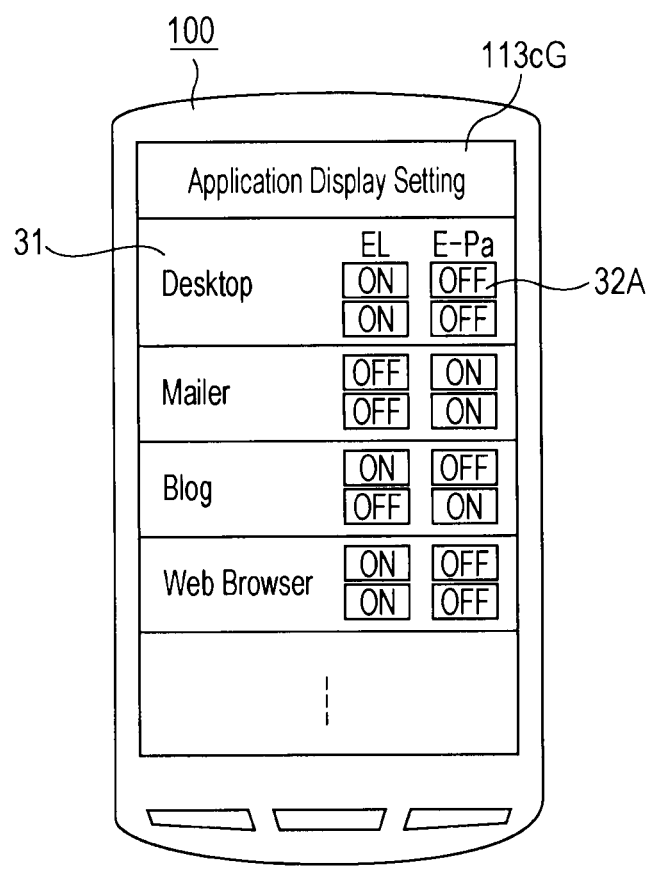
FIG. 14 is a diagram illustrating an example of a setting screen for setting a used display device and a display area used in accordance with each application software in the Modified Example 1.

FIG. 14 is a diagram illustrating an example of the setting screen for setting the display device used and the display area used in accordance with each application software when each of the first and second display devices 113*c* and 113*e* is partitioned into two areas.

The setting screen shown in FIG. 14 is provided with an application title column 31 which shows titles of the executable application software and an ON/OFF setting column 32A corresponding to each display area of the first and second display devices. That is, as shown in FIG. 14, in the ON/OFF setting column 32A, the column represented as "EL" is provided with ON/OFF setting sections for the first display device (the transparent organic EL display) 113*c*. In this case, each ON/OFF setting section of the upper half area 113*c*U and each ON/OFF setting section of the lower half area 113*c*D of the first display device 113*c* are provided to be arranged vertically for each application software.

Likewise, as shown in FIG. 14, in the ON/OFF setting column 32A, the column represented as "E-Pa" is provided with ON/OFF setting sections for the second display device (the electronic paper) 113e. In this case, each ON/OFF setting section of the upper half area 113eU and each ON/OFF setting section of the lower half area 113eD of the second display device 113e are provided to be arranged vertically for each application software.

In addition, as shown in FIG. 14, when the basic operation screen (Desktop) is displayed, both of the upper half area 113cU and the lower half area 113cD of the first display device 113c are set to be used, and the second display device 113e is set to be unused.

Further, as shown in FIG. 14, when the electronic mail software (Mailer) is executed, the first display device 113c is set to be unused, and both of the upper half area 113eU and the lower half area 113eD of the second display device 113e are set to be used.

Further, as shown in FIG. 14, when the blogging software (Blog) is executed, the upper half area 113cU of the first display device 113c and the lower half area 113eD of the second display device 113e are set to be used. That is, the lower half area 113cD of the first display device 113c and the upper half area 113eU of the second display device 113e are set to be unused.

Further, as shown in FIG. 14, when the browser (Web Browser) is executed, both of the upper half area 113cU and the lower half area 113cD of the first display device 113c are set to be used, and the second display device 113e is set to be unused.

In such a manner, it is possible to make a setting as to whether or not each partition area of the first and second display devices 113c and 113e is used. Here, as shown in FIGS. 13A and 13B, each of the first and second display devices 113c and 113e are partitioned into half areas placed one above the other. However, the claimed invention is not limited thereto. The sizes of the respective partition areas of the first and second display devices 113c and 113e may be set to appropriate sizes. In other words, the sizes of the partition areas may be set to various sizes.

Figure 15A:
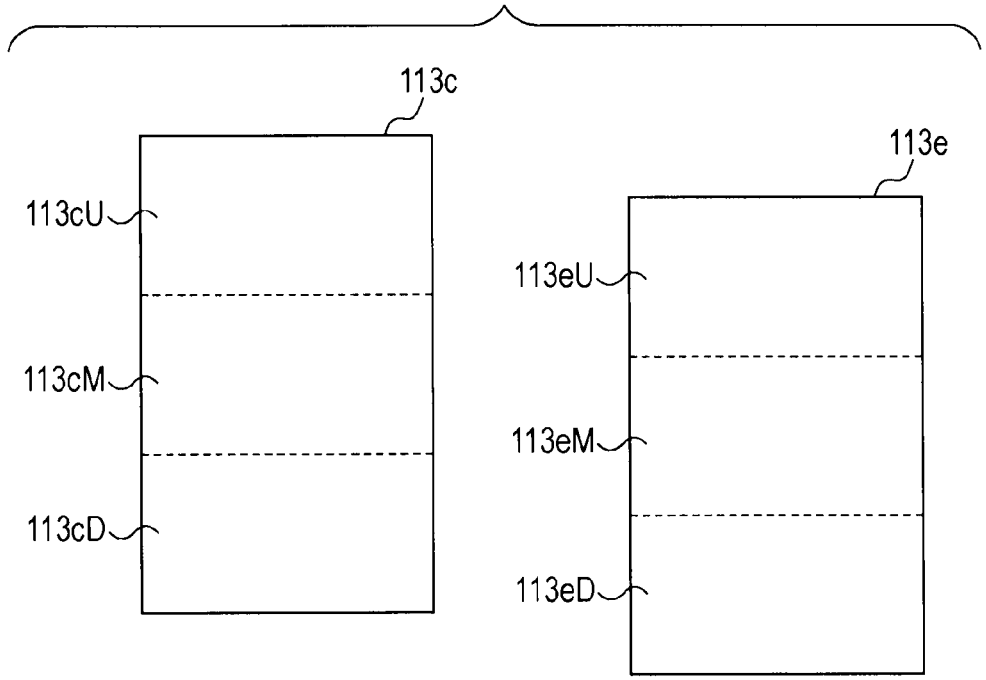
FIGS. 15A and 15B are diagrams illustrating other examples of partition areas of the first and second display devices.
Figure 15B:
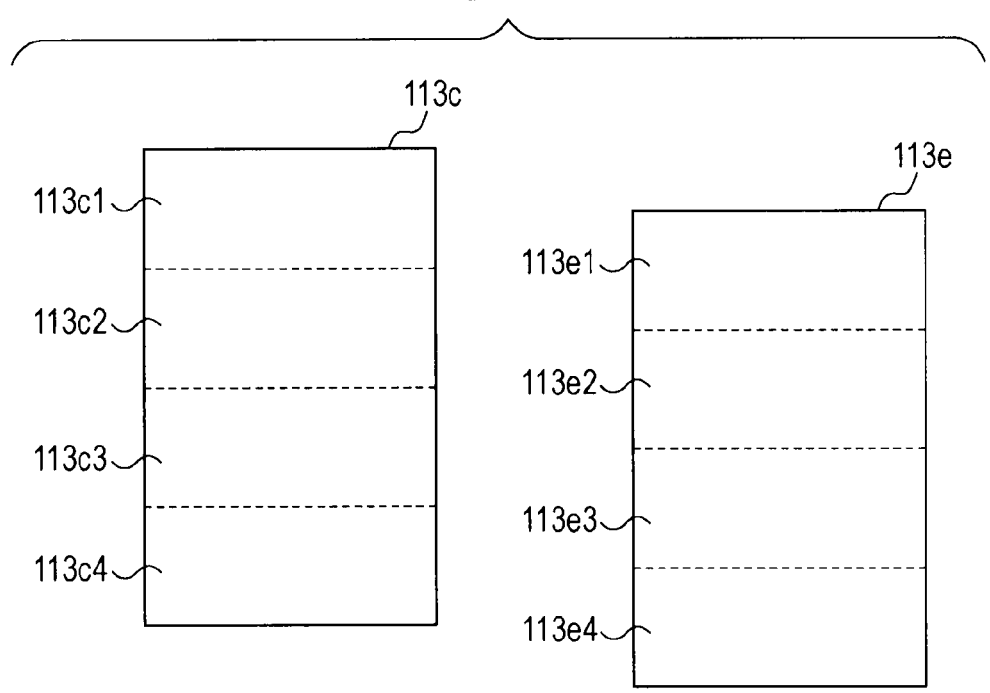

Further, in the case of Modified Example 1 described with reference to FIGS. 12 to 14, a description was given of the case where each of the first and second display devices 113c and 113e is partitioned into two upper and lower parts. However, the claimed invention is not limited thereto. FIGS. 15A and 15B are diagrams illustrating other examples of partition areas of the first and second display devices;

As shown in FIG. 15A, the first display device 113c may be partitioned into three parts like areas 113cU, 113cM, and 113cD, and the second display device 113e may be partitioned into three parts like areas 113eU, 113eM, and 113eD.

Further, as shown in FIG. 15B, the first display device 113c may be partitioned into four parts like areas 113c1, 113c2, 113c3, and 113c4, and the second display device 113e may be partitioned into four parts like areas 113e1, 113e2, 113e3, and 113e4.

It is apparent that partition into five parts, six parts, . . . is also possible. In addition, the number of partitions may be set to be different for each display device. For example, the first display device 113c may be partitioned into two parts, and the second display device 113e may be partitioned into four parts.

The display areas of the first and second display devices 113c and 113e are partitioned in such a manner that the display areas of the first and second display devices 113c and 113e do not overlap with each other, and thereby it is possible to display information on the respective first and second display devices 113c and 113e at the same time.

Modified Example 2

In the above-mentioned embodiment and Modified Example 1, a description was given of the exemplary case where the first display device 113c of the multi-layer-type display section 113 is the transparent organic EL display, and the second display device 113e is the electronic paper. However, the claimed invention is not limited thereto. As described above, the first and second display devices 113c and 113e may use several display devices. In addition, the information display may be performed on both of the first and second display devices.

Modified Example 2 described below has also basically the same configuration as that of the mobile phone terminal 100 according to the embodiment described with reference to FIGS. 1 to 4. Therefore, the mobile phone terminal of Modified Example 2 described hereinbelow is also represented as the mobile phone terminal 100, and will be described with reference to FIGS. 1 and 2 as necessary. However, the mobile phone terminal 100 according to the embodiment described hereinbelow is an example of the case where the first display device 113c of the multi-layer-type display section 113 employs the transparent organic EL display but the second display device 113eX employs an LED panel.

Figure 16:
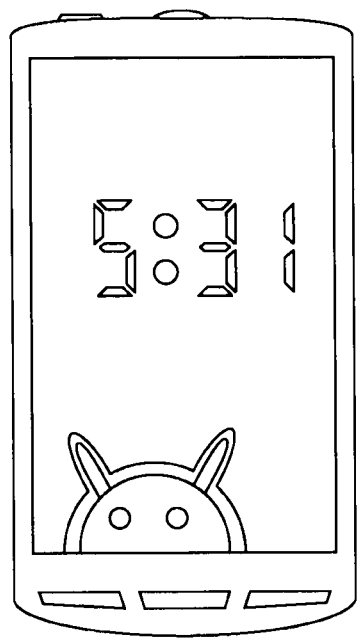
FIG. 16 is a diagram illustrating a display example of a mobile phone terminal according to a Modified Example 2.
Figure 17A:
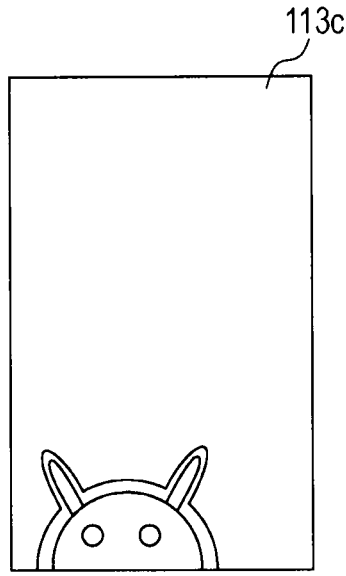
FIGS. 17A and 17B are diagrams illustrating display examples of the mobile phone terminal according to the Modified Example 2.
Figure 17B:
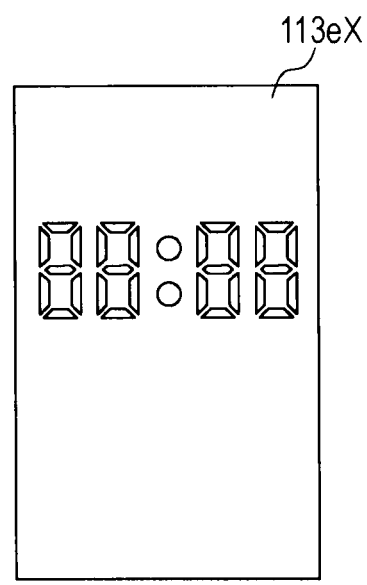

FIGS. 16, 17A, and 17B are diagrams illustrating display examples of the mobile phone terminal 100 according to the Modified Example 2. As shown in FIG. 16, in Modified Example 2, for example in the case of standby mode, by using both of the first and second display devices, display of a so-called wallpaper and display of a current time are performed.

Specifically, the wallpaper is, as shown in FIG. 17A, displayed in color by using the whole surface of the transparent organic EL display which is the first display device 113c. However, the part, in which the time display is performed, is displayed as a solid color in order to make the time display more visible. That is, in the case of the example shown in FIG. 17A, the character image is disposed on the lower side of the display screen, and the upper side thereof is displayed as the solid color.

The time display is performed, as shown in FIG. 17B, by using the LED panel. The LED panel is provided so that sets of 7 LEDs, which are arranged to represent the number "8", are arranged as two pairs of two digits with two LEDs for display of ":" (colon), which is for dividing hours and minutes, interposed therebetween.

The wallpaper is displayed on the whole surface of the first display device (the transparent organic EL display) 113c, and through the wallpaper displayed on the first display device 113c, the time display performed by the LEDs of the second display device 113eX is visible.

In such a manner, when the time display is performed only by the organic EL display, a necessary update of the time display can be set not to be performed. The time display is performed by the LEDs of the LED panel which is the second display device 113eX.

Figure 18:
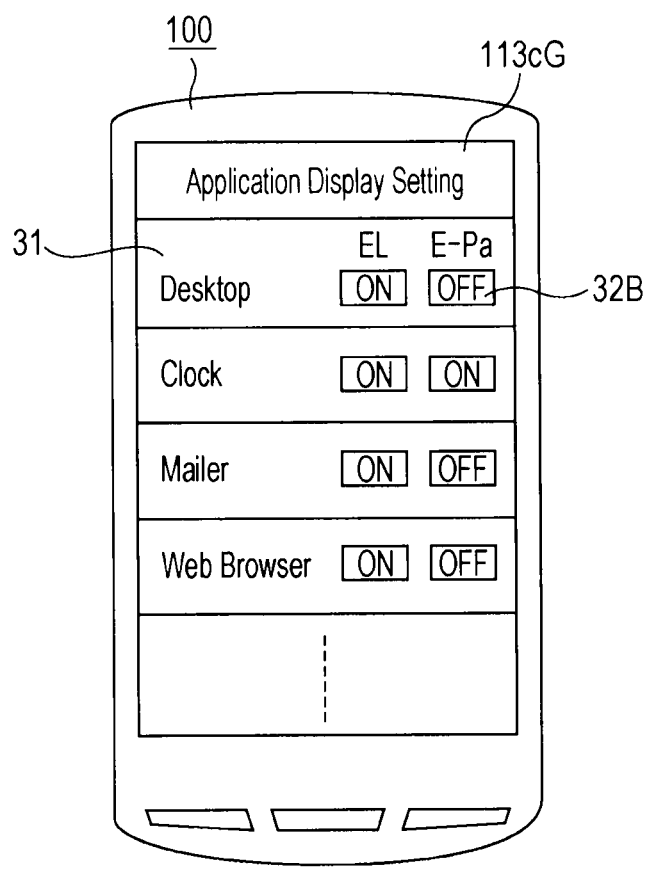
FIG. 18 is a diagram illustrating an example of a setting screen in a case where a setting is made so as to use one or both of the first and second display devices in the Modified Example 2.

FIG. 18 is a diagram illustrating an example of the setting screen in a case where the setting is made so as to use one or both of the first and second display devices 113c and 113eX in accordance with the application software.

The setting screen shown in FIG. 18 is provided with an application title column 31 which shows titles of executable application software and an ON/OFF setting column 32B of the first and second display devices.

That is, as shown in FIG. 18, in the ON/OFF setting column 32B, the column represented as "EL" is provided with ON/OFF setting sections for the first display device (the transparent organic EL display) 113c. Further, as shown in FIG. 18, in the ON/OFF setting column 32B, the column represented as "E-Pa" is provided with ON/OFF setting sections for the second display device (the LED panel) 113eX.

In addition, as shown in FIG. 18, when the basic operation screen (Desktop) is displayed, the first display device 113c is set to be turned ON, and the second display device 113eX is set to be unused.

Further, as shown in FIG. 18, when the time display software (Clock) to be used at the time of standby is executed, both of the first display device 113c and the second display device 113eX are set to be turned ON. Thereby, both of the first display device 113c and the second display device 113eX are set to be used.

Further, as shown in FIG. 18, when the mail software (Mailer) or the browser (Web Browser) is executed, the first display device 113c is set to be turned ON, and the second display device 113eX is set to be unused.

As described above, in the case of the Modified Example 2, the LED panel is used as the second display device, and both of the first and the second display device are used at the same time so as to respectively perform different displays, thereby allowing the multi-layer-type display section 113 to perform one display.

[Operations of Mobile Phone Terminal 100 in Modified Examples 1 and 2]

Figure 19:
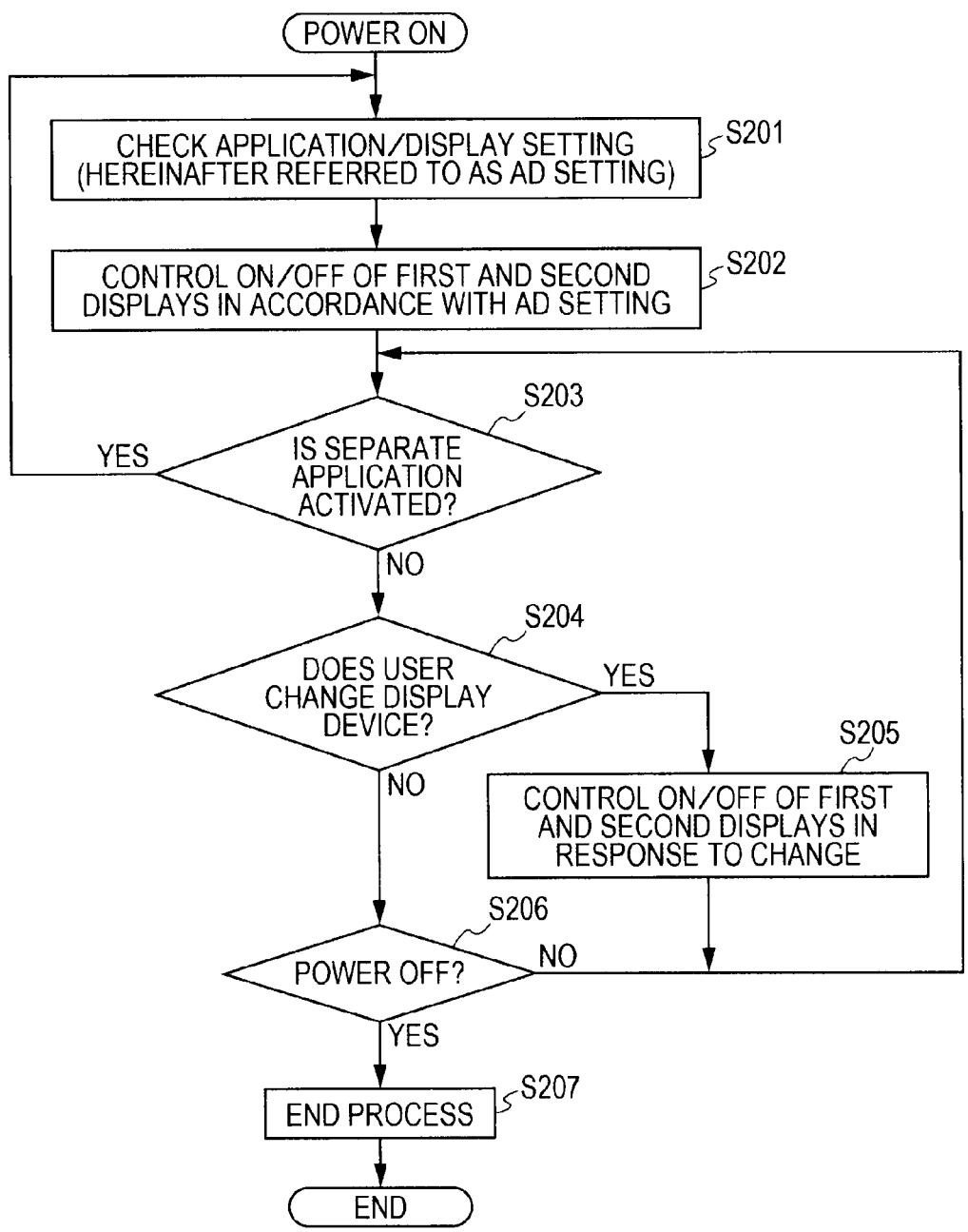
FIG. 19 is a flowchart illustrating a process executed mainly in a CPU in cases where a power source is applied to the mobile phone terminals according to the Modified Example 1 and the Modified Example 2.

FIG. 19 is a flowchart illustrating a process executed mainly in the CPU 130 in cases where a power source is applied to the mobile phone terminals 100 according to the Modified Example 1 and the Modified Example 2. When the power source is applied to the mobile phone terminal 100, the CPU 130 checks (refers to) the application display setting (hereinafter, referred to as the AD setting) of the AD setting DB of the EEPROM 111 (step S201).

The process of step S201 is the same as the process of step S101 shown in FIG. 10. In step S201 right after the application of the power source, the CPU 130 refers to the setting of the basic operation screen (Desktop). Further, after the setting is made so that the application software is executed, the CPU 130 refers to the AD setting for the application software to be executed in step S201.

Then, the CPU 130 controls, in accordance with the AD setting used as the reference in step S201, the display control section 112 to turn on/off the first and second display devices 113c and 113e (or, 113c and 113eX) (step S202).

Then, the CPU 130 allows a user to terminate the current application software through the key operation section 114 and the press detection section 115, and determines whether or not a different application software is set to be activated (step S203).

In the determination process of step S203, if it is determined that the different application software is set to be executed, the CPU 130 repeats the process from step S201. That is, as described above, in step S201, on the basis of the application software set to be newly executed, the CPU 130 refers to the AD setting of the AD setting DB of the EEPROM 111, and performs the process from step S202.

In the determination process of step S203, if it is determined that the different application software is not set to be executed, the CPU 130 determines whether or not the user inputs the instruction to change the display device of the multi-layer-type display section 113 through the key operation section 114 (step S204).

In the determination process of step S204, if it is determined that the instruction to change the display device is input, the CPU 130 performs, in accordance with the change instruction input, the ON/OFF control of the first and second display devices (step S205). Through the process of step S205, one or both of the first and second display devices are used to display information in a form corresponding to the change instruction performed by the user. After the process of step S205, the process from step S203 is repeated.

Further, in the determination process of step S204, if it is determined that the instruction to change the display device is not input, the CPU 130 determines whether or not the user performs an operation of turning off the power source through the key operation section 114 (step S206). In the determination process of step S206, if it is determined that the power source is not turned off, the CPU 130 repeats the process from step S203. Thereby, the CPU 130 waits for events such as the change of the application software, the change of the display device, and the power off.

Further, in the determination process of step S206, if it is determined that the power source is turned off, the CPU 130 performs the predetermined end process such as closing the reference file (step S207), and ends the process of FIG. 19.

As described above, in the cases of Modified Examples 1 and 2, by partitioning the display screens of the first and second display devices, it is possible to control the setting of which display device is used and which display area is used in the set display device, or it is possible to use both of the first and second display devices as it is.

In addition, besides the configuration shown in FIG. 17B, the LED panel is able to display characters or signs by using the LED panel having a plurality of display portions each of which is formed by arranging a plurality of LEDs like, 8×8, 10×10, for example.

Modified Example 3

Modified Example 3 described hereinbelow is, similarly to the case of the above-mentioned second embodiment, for using one or both of the first display device and the second display device. Modified Example 3 is, similarly to the above-mentioned embodiment and Modified Example 1, an example in which the first display device 113c of the multi-layer-type display section 113 is the transparent organic EL display and the second display device 113e is the electronic paper.

Modified Example 3 described below has also basically the same configuration as that of the mobile phone terminal 100 according to the embodiment described with reference to FIGS. 1 to 4. Therefore, the mobile phone terminal of Modified Example 3 described hereinbelow is also represented as the mobile phone terminal 100, and will be described with reference to FIGS. 1 and 2 as necessary.

Figure 20C:
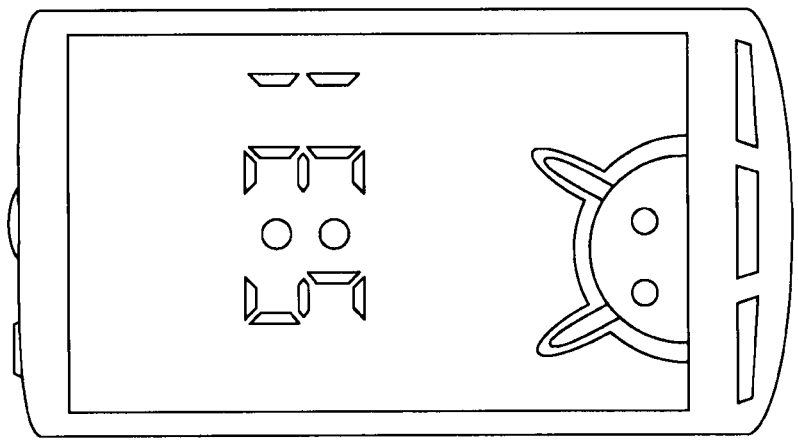
FIGS. 20A, 20B, and 20C are diagrams illustrating methods of using a multi-layer-type display section according to a Modified Example 3.
Figure 20B:
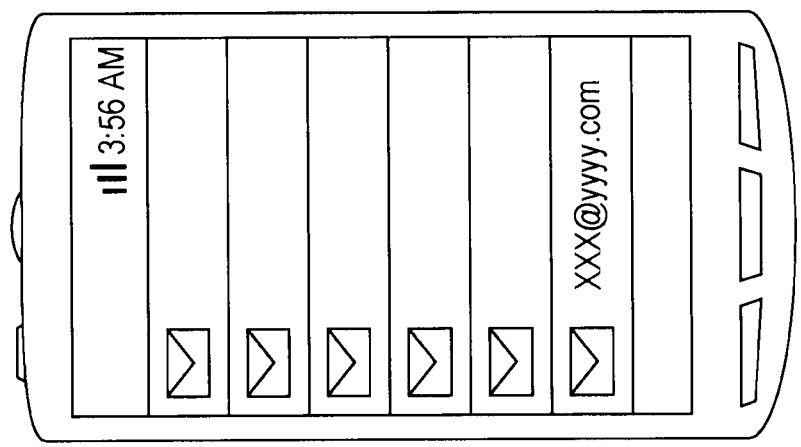
Figure 20A:
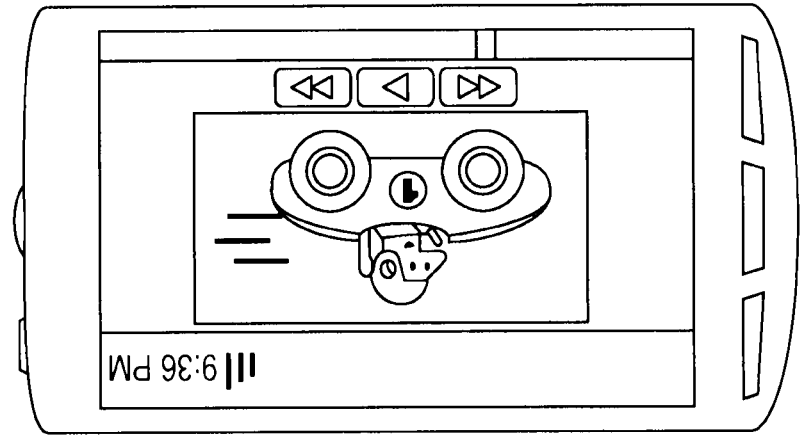

FIGS. 20A, 20B, 20C, and 21 are diagrams illustrating display examples of the mobile phone terminal 100 according to the Modified Example 3. FIG. 20A shows a display example at the time of executing the moving picture display software (Moving Picture) for displaying a moving picture. In this case, the image display is performed on the first display device (the transparent organic EL display) 113c which has a high response speed when changing of the display image and is capable of color display.

Further, FIG. 20B shows a display example at the time of executing the mailer software (Mailer). In this case, there is no problem even when the response speed during display change is not so high, besides the text display is mostly used, and thus it is not necessary to perform color display. For this reason, the second display device (the electronic paper) 113e performs the image display.

Furthermore, FIG. 20C shows a display example of the basic operation screen (Desktop) at the time of applying the power source. In this case, similarly to the case of the above-mentioned Modified Example 2, the display of the so-called wallpaper and the display of the current time are performed.

In this case, the wallpaper is displayed in color by using the whole surface of the transparent organic EL display which is the first display device 113c. However, the part, in which the time display is performed, is displayed as a solid color in order to make the time display more visible. That is, the character image is disposed on the lower side of the display screen, and the upper side thereof is displayed as the solid color.

In addition, the time display is performed by using the electronic paper which is the second display device 113e. With such a configuration, similarly to the case of the above-mentioned Modified Example 2, the wallpaper is displayed on the whole surface of the first display device (the transparent organic EL display) 113c, and through the wallpaper displayed on the first display device 113c, the time display performed by the electronic paper of the second display device 113e is visible.

With such a configuration, when the time display is performed only by the organic EL display, necessary update of the time display can be set not to be performed. The time display is performed by the electronic paper which is the second display device 113e with low power consumption.

Figure 21:
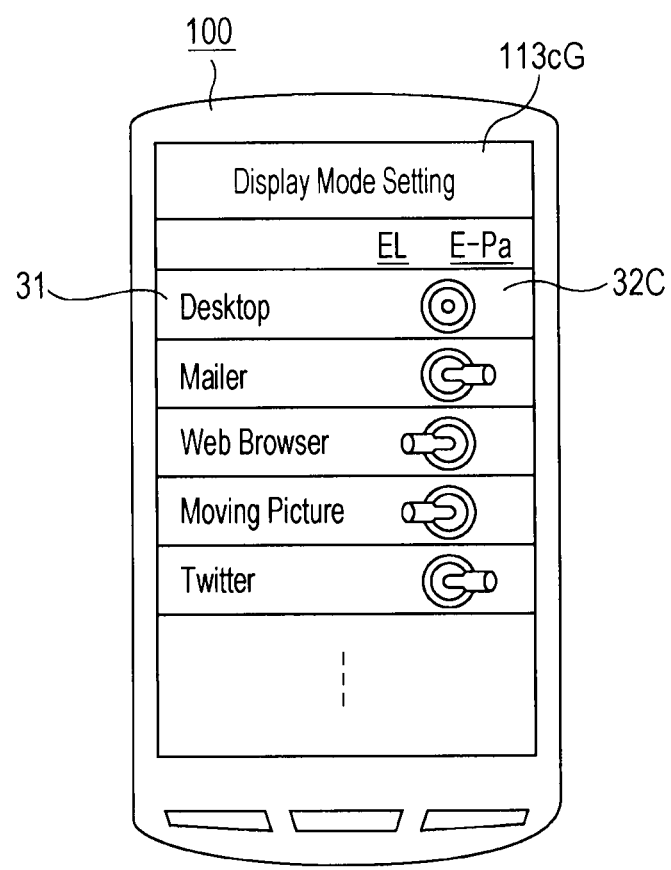
FIG. 21 is a diagram illustrating an example of a setting screen for setting a used display device in accordance with each application software in the Modified Example 3.

FIG. 21 is a diagram illustrating an example of the setting screen in a case where the setting is made so as to use one or both of the first and second display devices 113c and 113e in accordance with the application software.

The setting screen shown in FIG. 21 is provided with an application title column 31 which shows the titles of executable application software and an ON/OFF setting column 32C of the first and second display devices.

In this case, as shown in FIG. 21, the changeover switches are displayed in the ON/OFF setting column 32C. In FIG. 21, when the indication of each changeover switch is tripped to the side (the left side in FIG. 21) indicated by "EL", this state represents a state where the first display device (the transparent organic EL display) 113c is set to be turned on. Accordingly, in this case, the second display device (the electronic paper) 113e is set to be unused.

Further, when the indication of the changeover switch is tripped to the side (the right side in FIG. 21) indicated by "E-Pa" in FIG. 21, this state represents a state where the second display device (the electronic paper) 113e is set to be turned on. In this case, the first display device (the transparent organic EL display) 113c is set to be unused.

Moreover, in FIG. 21, when the indication of the changeover switch is tripped to neither of the sides indicated by "EL" and "E-Pa" in FIG. 21, this state represents a state where both the first and second display devices are set to be turned on. Consequently, both the first and second display devices are set to be used.

Therefore, as shown in FIG. 21, when the basic operation screen (Desktop) is displayed, the indication of the changeover switch is tripped to neither of the sides indicated by "EL" and "E-Pa". This state represents a state where both first and second display devices are set to be turned on. In this case, as shown in FIG. 20C, it is possible to simultaneously perform the wallpaper display using the whole surface of the transparent organic EL display as the first display device 113c and the time display using the electronic paper as the second display device 113e.

Further, as shown in FIG. 21, when the mailer software (Mailer) or the twitter software (Twitter) which mainly displays textual information is executed, the second display device 113e is set to be turned on. Further, when the moving picture display software (Moving Picture) or the browser (Web Browser) which mainly displays the moving picture or the color image is executed, the first display device 113c is set to be turned on.

As described above, in Modified Example 3, the transparent organic EL display is used as the first display device 113c, and the electronic paper is used as the second display device 113e. Even in this case, both are used at the same time so as to perform display. That is, similarly to the above-mentioned embodiment, in addition to merely using either of the first and second display devices, by using both of the transparent organic EL display 113c and the electronic paper 113e in the same manner as Modified Example 2, it is possible to perform different information display for each of them.

In addition, in FIG. 21, the display devices are selected through the touch panel which is added to the display screen of the mobile phone terminal 100. Specifically, in the ON/OFF setting column of the first and second display devices corresponding to the target application, by flicking the indication of the changeover switch in a direction in which the switch is intended to be tripped, the indication of the changeover switch can be adjusted to the target state. In such a manner, it is possible to select the state where one or both of the first and second display devices are set to be turned on.

The selection setting (the above-mentioned AD setting), by which the display device is selected for each application in such a manner, is stored in EEPROM 111 as described above. Accordingly, on the basis of the selection setting of the EEPROM 111, the CPU 130 is able to perform, with the aid of the display control section 112, the information display on the display device selected for each executed application software.

In addition, the operation of the mobile phone terminal 100 in the case of Modified Example 3 is the same as the operations of the mobile phone terminal 100 in the cases of Modified Examples 1 and 2 described with reference to the flowchart of FIG. 19.

Modified Example 4

In the above-mentioned embodiment and Modified Examples, the multi-layer-type display section 113 is configured to employ the first display device and the second display device, and is configured so that the first display device 113c, which is formed so that the other display device is present on the lower layer side, has transparency. However, the claimed invention is not limited thereto. Moreover, it may be possible to adopt a configuration of the multi-layer-type display section in which a large number of display devices are laminated.

Figure 22:
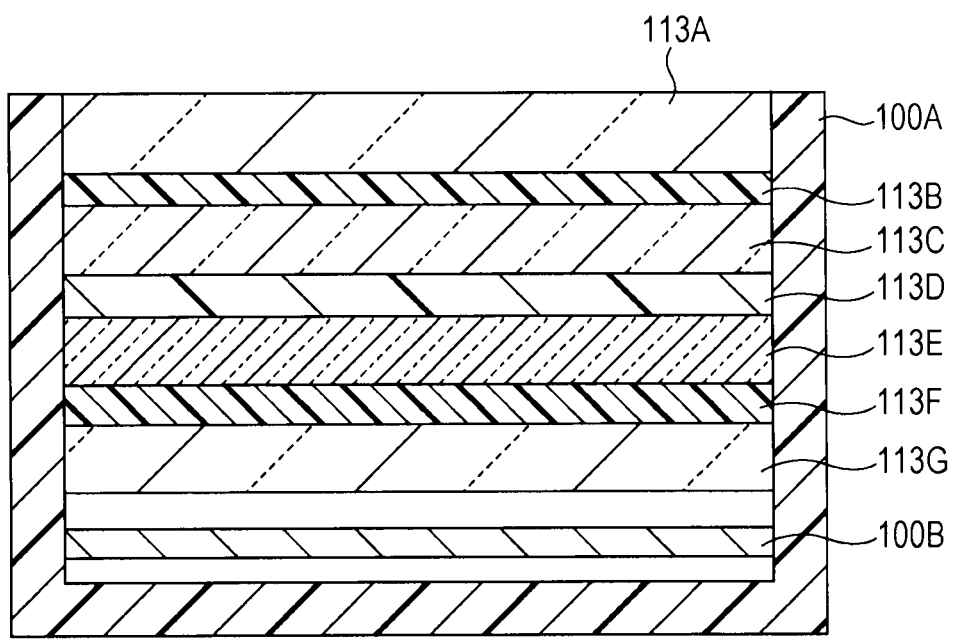
FIG. 22 is a diagram illustrating another example (the Modified Example 3) of the multi-layer-type display section formed by using different three display devices.

FIG. 22 is a diagram illustrating another example of the multi-layer-type display section 113 formed by using different three display devices 113C, 113E, and 113G. FIG. 22 is, similarly to the above-mentioned case of FIG. 2, a cross-sectional view of a portion of the multi-layer-type display section 113 of the mobile phone terminal 100 cut along the horizontal direction intersecting with the lengthwise direction (the vertical direction).

As shown in FIG. 22, in the casing 100A of the mobile phone terminal 100, the multi-layer-type display section 113 of Modified Example 4 is formed by laminating, in order from the upper layer side which is a side viewed by a user, a transparent plate 113A, an adhesive sheet 113B, a first display device 113C, an adhesive sheet 113D, a second display device 113E, an adhesive sheet 113F, a third display device 113G, and a base 100B.

Here, the casing 100A and the base 100B have the same configuration as the casing 100A and the base 100B shown in FIG. 2. Further, the transparent plate 113A has the same configuration as the transparent plate 113a shown in FIG. 2. In addition, the respective adhesive sheets 113B, 113D, and 113F have the same configuration as the adhesive sheets 113b and 113d shown in FIG. 2.

In the case of Modified Example 4, the first display device 113C and the second display device 113E located above the third display device 113G are configured to be transparent. Specifically, since the other display device is present on the lower layer side of the first display device 113C and the second display device 113E, in order to view the display of the lower-layer-side display, those are configured to be transparent.

In the case of Modified Example 4, the first display device 113C is, for example, the transparent organic EL display which has high power consumption but has a high response speed in changing the display and is capable of displaying high quality color image. Further, the second display device 113E is, for example, the transparent LCD which, as compared with the first display device 113C, has low power consumption and has a high response speed in changing the display but displays a color image having a lower quality than that of the first display device. In addition, the third display device 113G is, for example, the electronic paper which has extremely low power consumption and is excellent in visibility but performs only monochrome display and has a low response speed in changing the display.

In the case of the mobile phone terminal 100 using the multi-layer-type display section 113 shown in FIG. 22 according to Modified Example 4, the CPU 130 and the display control section 112, in cooperation with each other, selectively use the first, second, and third display devices 113C, 113E, and 113G.

For example, as in the above-mentioned example, in the case of operating application software such as the photo display software (Photo) or the moving picture display software (Moving Picture) which is necessary to display a photo or a moving picture with high quality, the first display device 113C performs the information display. Further, in the case of operating the browser (Web Browser) so as to browse a webpage, the second display device 113E performs the information display. Further, in the case of operating the electronic book reading software (E-Book), the electronic mail software (Mailer), the blogging software (Blog), the twitter software (Twitter), or the like so as to mainly display textual information, the third display device 113G performs the information display.

In such a manner, it is possible to more selectively change the display device used in display, and thus it is possible to more appropriately decrease power consumption. Moreover, it is possible to perform the information display by using the display device which is most suitable for the information to be displayed.

In addition, other than another example of the multi-layer-type display section 113 shown in FIG. 22, it may be possible to adopt a configuration of the multi-layer-type display section 113 in which a larger number of display devices are laminated. Then, when the plurality of transparent display devices is laminated so that their display screens coincide with each other, there is a problem in transmittance. However, for example, by using a method in which the line patterns of the used transparent electrodes are laminated to coincide with one another among the transparent display devices, it is possible to make the display of the display devices, which is positioned on the lower layer side, visible.

[Others]

In the above-mentioned embodiment, description was given of the exemplary case where the embodiment is applied to the mobile phone terminal, but the claimed invention is not limited thereto. The embodiment can be applied to various kinds of display apparatuses, such as personal information terminals called PDAs (Personal Digital Assistants), and personal laptop computers, having a relatively large display section on the display screen.

Further, the display device used is not limited to the above description. However, a display device, which is formed so that another display device is present on the lower side of itself, may employ various kinds of transparent display devices. Further, a display device (the display device at the bottom layer), at a position where another display device is absent on the lower side of itself, may employ either of a transparent display device and an opaque display device.

It should be understood by those skilled in the art that various modifications, combinations, sub-combinations and alterations may occur depending on design requirements and other factors insofar as they are within the scope of the appended claims or the equivalents thereof.

What is claimed is:

1. A display apparatus comprising:
a display section including a plurality of thin display devices formed at multiple layers such that their display screens overlap with one another, wherein at least one of the display devices closest to a viewing side of the display section is configured to be transparent;
storage means for storing setting information, that is configurable by a user, associating each of a plurality of different application programs with at least one of the display devices; and
control means for controlling each display of the plurality of display devices of the display section according to the setting information,
wherein the control means is configured to select either a normal mode or a text mode in accordance with each of the plurality of different application programs, the normal mode being a mode for displaying image or video data, the text mode being a mode for displaying mostly textual information, and
the control means uses the at least one of the display devices closest to the viewing side of the display section when the application program is in the normal mode, and uses one of the display devices farthest from the viewing side of the display section for a display when the application program is in the text mode,
wherein each of the display devices has a plurality of display areas, and the setting information, which is configurable by the user, further associates each of the application programs with a plurality of settings corresponding to each individual display area of the display devices.

2. The display apparatus according to claim 1, wherein the plurality of thin display devices are laminated.

3. The display apparatus according to claim 1, wherein the control means uses different display areas on a plurality of the display devices to simultaneously display information on the plurality of display devices.

4. The display apparatus according to claim 1, wherein the control means is configured to select either a normal mode or a text mode in accordance with the at least one application program, the normal mode being a mode for displaying image or video data, the text mode being a mode for displaying mostly textual information, and
the control means uses the at least one of the display devices closest to the viewing side of the display section when the application program is in the normal mode, and uses one of the display devices farthest from the viewing side of the display section for a display when the application program is in the text mode.

5. The display apparatus according to claim 1, further comprising:
input receiving means for receiving an instruction input on which of the plurality of display devices is used for an application program.

6. The display apparatus according to claim 1, wherein the electric power consumption of one of the display devices farthest from a viewing side of the display section is lower than that of the display device that is closest to the viewing side of the display section.

7. The display apparatus according to claim 1, wherein the at least one of the display devices closest to the viewing side of the display section is one of a transparent organic electroluminescence display panel and a transparent LCD panel.

8. The display apparatus according to claim 1, wherein one of the display devices that is farthest from the viewing side of the display section is non-transparent.

9. The display apparatus according to claim 1, wherein one of the display devices that is farthest from the viewing side of the display section is one of electronic paper, a polymer-dispersed liquid crystal panel, a cholesteric liquid crystal panel, and an LED display panel.

10. The display apparatus according to claim 1, wherein one of the display devices that is farthest from the viewing side of the display section has a display color that is monochrome.

11. The display apparatus according to claim 1, wherein the plurality of display devices includes at least three display devices each having a different amount of power consumption from each other.

12. The display apparatus according to claim 11, wherein a first one of the display devices which is closest to the viewing side of the display section is a transparent organic EL display; a second one of the display devices which is beneath the first one of the display devices is a transparent LCD display; and a third one of the display devices which is farthest from the viewing side of the display section is non-transparent and one of electronic paper, a polymer-dispersed liquid crystal panel, a cholesteric liquid crystal panel, and an LED display panel.

13. The display apparatus according to claim 1, wherein one of the plurality of display areas of the display device farthest from the viewing side of the display section is configured to be set as a software keyboard screen depending on the application program.

14. A method implemented on a display apparatus that includes a plurality of thin display devices formed at multiple layers such that their display screens overlap with one another, wherein at least one of the display devices closest to a viewing side of a display section is configured to be transparent, the method comprising:
storing setting information, that is configurable by a user, associating each of a plurality of different application programs with at least one of the display devices; and
controlling each display of the plurality of display devices of the display section according to the setting information,
wherein the controlling includes selecting either a normal mode or a text mode in accordance with each of the plurality of different application programs, the normal mode being a mode for displaying image or video data, the text mode being a mode for displaying mostly textual information, and
the controlling includes using the at least one of the display devices closest to the viewing side of the display section when the application program is in the normal mode, and using one of the display devices farthest from the viewing side of the display section for a display when the application program is in the text mode,
wherein each of the display devices has a plurality of display areas, and the setting information, which is configurable by the user, further associates each of the application programs with a plurality of settings corresponding to each individual display area of the display devices.

15. A mobile terminal apparatus comprising:
a display section including a plurality of thin display devices formed at multiple layers such that their display screens overlap with one another, wherein at least one of the display devices closest to a viewing side of the display section is configured to be transparent;
a storage device that stores setting information, that is configurable by a user, associating each of a plurality of different application programs with at least one of the display devices; and
a controller that controls each display of the plurality of display devices of the display section according to the setting information,
wherein the controller is configured to select either a normal mode or a text mode in accordance with each of the plurality of different application programs, the normal mode being a mode for displaying image or video data, the text mode being a mode for displaying mostly textual information, and
the controller uses the at least one of the display devices closest to the viewing side of the display section when the application program is in the normal mode, and uses one of the display devices farthest from the viewing side of the display section for a display when the application program is in the text mode,
wherein each of the display devices has a plurality of display areas, and the setting information, which is configurable by the user, further associates each of the application programs with a plurality of settings corresponding to each individual display area of the display devices.

* * * * *